US012726917B2

(12) United States Patent
Liu

(10) Patent No.: US 12,726,917 B2
(45) Date of Patent: Sep. 1, 2026

(54) SIGNAL FORWARDING METHOD AND COMMUNICATION APPARATUS

(71) Applicant: HUAWEI TECHNOLOGIES CO., LTD., Shenzhen (CN)

(72) Inventor: Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 18/494,943

(22) Filed: Oct. 26, 2023

(65) Prior Publication Data

US 2024/0056992 A1 Feb. 15, 2024

Related U.S. Application Data

(63) Continuation of application No. PCT/CN2022/088534, filed on Apr. 22, 2022.

(30) Foreign Application Priority Data

Apr. 28, 2021 (CN) ......................... 202110469046.8

(51) Int. Cl.
*H04W 24/10* (2009.01)
*H04W 52/24* (2009.01)
(Continued)

(52) U.S. Cl.
CPC ........... *H04W 52/46* (2013.01); *H04W 24/10* (2013.01); *H04W 52/241* (2013.01); *H04W 52/52* (2013.01)

(58) Field of Classification Search
CPC ... H04W 52/46; H04W 52/24; H04W 52/241; H04W 52/52; H04W 24/10
See application file for complete search history.

(56) References Cited

U.S. PATENT DOCUMENTS 7,050,758 B2 * 5/2006 Dalgleish ............. H04B 7/2606 455/11.1
7,720,020 B2 * 5/2010 Larsson ................. H04B 7/022 455/13.1

(Continued)

FOREIGN PATENT DOCUMENTS

CN 1640011 A 7/2005
JP 2011010102 A 1/2011

(Continued)

OTHER PUBLICATIONS

3rd Generation Partnership Project; Technical Specification Group Radio Access Network; NR; Physical channels and modulation (Release 16), 3GPP TS 38.211 V16.3.0 (Sep. 2020), total 133 pages.

(Continued)

*Primary Examiner* — Hai V Nguyen
(74) *Attorney, Agent, or Firm* — Rimon PC

(57) ABSTRACT

This application provides a signal forwarding method and a communication apparatus, and relates to the field of communication technologies, to select a suitable amplifying power to amplify a to-be-forwarded signal and forward an amplified to-be-forwarded signal. The method includes: receiving the to-be-forwarded signal; amplifying the to-be-forwarded signal based on an amplification gain of the to-be-forwarded signal, where the amplification gain of the to-be-forwarded signal is determined by measuring a measurement signal, and the measurement signal corresponds to the to-be-forwarded signal; and forwarding the amplified to-be-forwarded signal. A relay device may determine the amplification gain of the to-be-forwarded signal by measuring the measurement signal, and amplify the to-be-forwarded signal based on the amplification gain of the to-be-forwarded signal and forward the amplified to-be-forwarded signal.

20 Claims, 4 Drawing Sheets

(51) Int. Cl.
*H04W 52/46* (2009.01)
*H04W 52/52* (2009.01)

(56) References Cited

U.S. PATENT DOCUMENTS 7,933,549 B2 * 4/2011 Larsson .............. H04L 25/0224 455/7
8,909,133 B2 * 12/2014 Hobbs ................ H04B 7/15535 455/67.11
8,937,874 B2 * 1/2015 Gainey .............. H04B 7/15578 455/10
9,584,211 B2 * 2/2017 Kang ................... H04B 7/0413
9,912,027 B2 * 3/2018 Henry ....................... H01P 1/30
9,948,333 B2 * 4/2018 Henry ...................... H04B 3/52
11,848,719 B2 * 12/2023 Yuan .................... H04B 17/345
12,348,297 B2 * 7/2025 Zhang .................. H04B 7/0695
12,368,497 B2 * 7/2025 Rofougaran ....... H04B 7/15514
12,483,996 B2 * 11/2025 Gutman ................ H04W 52/40
2003/0211828 A1 * 11/2003 Dalgleish ........... H04B 7/15535 455/11.1
2007/0160014 A1 * 7/2007 Larsson ................ H04W 40/02 370/338
2011/0151775 A1 6/2011 Kang et al.
2013/0077502 A1 * 3/2013 Gainey .............. H04B 7/15578 370/252
2015/0200722 A1 * 7/2015 Kang ................... H04B 7/1555 370/315
2019/0208510 A1 * 7/2019 Park ...................... H04W 52/34
2020/0252838 A1 * 8/2020 Akdeniz ........... H04W 36/0009
2020/0403689 A1 * 12/2020 Rofougaran ....... H04B 7/15514
2022/0109515 A1 * 4/2022 Chervyakov .......... H04B 17/29
2022/0132494 A1 * 4/2022 Kumar .................. H04L 5/0048
2023/0100135 A1 * 3/2023 Liu ....................... H04W 24/08 370/252
2023/0180044 A1 * 6/2023 Lu ......................... H04W 24/08 370/252
2023/0239096 A1 * 7/2023 Go ........................ H04L 5/0098 370/329
2023/0327977 A1 * 10/2023 Abedini ................ H04W 40/02
2023/0387996 A1 * 11/2023 Leather ................. H04W 72/51
2024/0039614 A1 * 2/2024 Sriram ................... H04B 7/155
2024/0064649 A1 * 2/2024 Go ....................... H04W 52/262
2024/0098653 A1 * 3/2024 Gutman ................ H04W 52/40
2024/0187085 A1 * 6/2024 Mcmenamy ....... H04B 7/15557
2024/0244608 A1 * 7/2024 Yuan .................. H04B 7/15528
2024/0297773 A1 * 9/2024 Huang .................... H04L 5/001
2024/0333354 A1 * 10/2024 Nammi ................... H04L 27/34
2025/0081048 A1 * 3/2025 Lebrun ............. H04W 36/0058

FOREIGN PATENT DOCUMENTS

WO 2020087483 A1 5/2020
WO WO-2024035673 A1 * 2/2024 ............ H04W 88/02

OTHER PUBLICATIONS

3rd Generation Partnership Project; Technical Specification Group Radio Access Network; NR; Multiplexing and channel coding (Release 16), 3GPP TS 38.212 V16.3.0 (Sep. 2020), total 152 pages.
3rd Generation Partnership Project; Technical Specification Group Radio Access Network; NR; Physical layer procedures for control (Release 16), 3GPP TS 38.213 V16.3.0 (Sep. 2020), total 179 pages.
3rd Generation Partnership Project; Technical Specification Group Radio Access Network; NR; Physical layer procedures for data (Release 16), 3GPP TS 38.214 V16.3.0 (Sep. 2020), total 166 pages.
3rd Generation Partnership Project; Technical Specification Group Radio Access Network; NR; Medium Access Control (MAC) protocol specification (Release 16), 3GPP TS 38.321 V16.3.0 (Dec. 2020), total 156 pages.
3rd Generation Partnership Project; Technical Specification Group Radio Access Network; NR; Radio Resource Control (RRC) protocol specification (Release 16), 3GPP TS 38.331 V16.3.0 (Dec. 2020), total 932 pages.
3rd Generation Partnership Project; Technical Specification Group Radio Access Network; NR; User Equipment (UE) radio access capabilities (Release 16), 3GPP TS 38.306 V16.3.0 (Dec. 2020), total 135 pages.
3rd Generation Partnership Project; Technical Specification Group Radio Access Network; NR; Requirements for support of radio resource management (Release 16), 3GPP TS 38.133 V16.3.0 (Mar. 2020), total 31 pages.

* cited by examiner

SIGNAL FORWARDING METHOD AND COMMUNICATION APPARATUS

CROSS-REFERENCE TO RELATED APPLICATIONS

This application is a continuation of International Application No. PCT/CN2022/088534, filed on Apr. 22, 2022, which claims priority to Chinese Patent Application No. 202110469046.8, filed on Apr. 28, 2021. The disclosures of the aforementioned applications are hereby incorporated by reference in their entireties.

TECHNICAL FIELD

This application relates to the field of communication technologies, and in particular, to a signal forwarding method and a communication apparatus.

BACKGROUND

In current communication networks, a relay device may be disposed between an access network device and a terminal device to improve the signal transmission performance. However, when downlink signals sent by the access network device to the relay device are different (for example, signal bandwidths are different, and signal beams are different), the powers of the downlink signals received by the relay device are different. Because of the different powers of the downlink signals, the relay device cannot select a suitable amplifying power to amplify the different downlink signals.

SUMMARY

This application provides a signal forwarding method and a communication apparatus, to resolve a problem in conventional technologies that a relay device cannot select a suitable amplifying power to amplify downlink signals.

To achieve the foregoing objective, the following technical solutions are used in this application.

According to a first aspect, a signal forwarding method is provided. The method includes:

A relay device receives a to-be-forwarded signal. The relay device amplifies the to-be-forwarded signal based on an amplification gain of the to-be-forwarded signal, where the amplification gain of the to-be-forwarded signal is determined by measuring a measurement signal, and the measurement signal corresponds to the to-be-forwarded signal. The relay device then forwards an amplified to-be-forwarded signal.

Based on the foregoing technical solutions, an embodiment of this application provides a signal forwarding method. After receiving a to-be-forwarded signal, a relay device amplifies the to-be-forwarded signal based on an amplification gain of the to-be-forwarded signal and forwards an amplified to-be-forwarded signal. The amplification gain is determined by measuring a measurement signal. The measurement signal corresponds to the to-be-forwarded signal. In this way, the relay device determines the amplification gain of the to-be-forwarded signal by measuring the measurement signal, thereby resolving a problem in conventional technologies that the relay device cannot select a suitable amplifying power to amplify a downlink signal.

In addition, in the signal forwarding method provided in this embodiment of this application, the relay device may measure the measurement signal in advance to determine the amplification gain of the to-be-forwarded signal. After receiving the to-be-forwarded signal, the relay device amplifies the to-be-forwarded signal based on the amplification gain of the to-be-forwarded signal and forwards an amplified to-be-forwarded signal. This can prevent a problem that the relay device cannot completely forward the to-be-forwarded signal where the problem is caused by the measurement performed when the to-be-forwarded signal is received.

According to the first aspect, in a possible implementation, the to-be-forwarded signal is carried on a time-frequency resource. The time-frequency resource corresponds to the measurement signal. Receiving a to-be-forwarded signal specifically includes receiving a signal carried on the time-frequency resource. Amplifying the to-be-forwarded signal based on an amplification gain of the to-be-forwarded signal specifically includes: determining, based on a correspondence between the time-frequency resource and the measurement signal, the amplification gain determined by measuring the measurement signal, and amplifying, based on the amplification gain, the signal carried on the time-frequency resource.

Based on this, the time-frequency resource carrying the to-be-forwarded signal is associated with the measurement signal, so that after the relay device measures the measurement signal to determine the amplification gain, the relay device may directly amplify, after receiving the to-be-forwarded signal on the time-frequency resource, the to-be-forwarded signal based on the amplification gain of the to-be-forwarded signal and then forward an amplified to-be-forwarded signal. In this way, a delay in forwarding a signal by the relay device is reduced.

According to the first aspect, in a possible implementation, the method further includes: The relay device receives the measurement signal, and measures the measurement signal to determine the amplification gain.

Based on this, the relay device measures the measurement signal to determine the amplification gain, so that the relay device can amplify, based on the amplification gain, the to-be-forwarded signal corresponding to the measurement signal and forward an amplified to-be-forwarded signal, thereby improving the efficiency of determining the amplification gain of the to-be-forwarded signal by the relay device.

According to the first aspect, in a possible implementation, the measuring the measurement signal to determine the amplification gain specifically includes: measuring the measurement signal to determine a receive quality; and determining the amplification gain based on the receive quality and a target transmit quality.

Based on this, the relay device may determine the amplification gain by measuring the receive quality of the signal and the target transmit quality. The receive quality may be represented by using a receive power. The target transmit quality may be represented by using a target transmit power. In this way, the relay device may directly determine an amplifying power based on the receive power and the target transmit power.

According to the first aspect, in a possible implementation, the determining the amplification gain based on the receive quality and target transmit quality specifically includes: determining the amplification gain based on the receive quality and a target transmit quality corresponding to an EVM.

Based on this, the relay device may further determine amplification gains of the measurement signal and the to-be-forwarded signal under different EVMs, so that the determined amplification gains of the to-be-forwarded signal better meet a forwarding requirement of the to-be-forwarded signal.

According to the first aspect, in a possible implementation, the measurement signal is indicated by using at least one of the following signalings: RRC, a MAC-CE, and DCI.

Based on this, the access network device may indicate the measurement signal to the relay device by using different signaling messages, thereby increasing the number of application scenarios in which the access network device indicates the measurement signal.

According to the first aspect, in a possible implementation, the EVM is indicated by at least one of the signalings.

Based on this, the access network device may indicate the EVM to the relay device by using different signaling messages, thereby increasing the number of application scenarios in which the access network device indicates the EVM.

According to the first aspect, in a possible implementation, the method further includes: reporting the amplification gain.

Based on this, the relay device may report the amplification gain to the access network device, so that the access network device can determine the amplification gain determined by measuring the measurement signal. This provides a basis for the access network device to determine the amplification gain of the to-be-forwarded signal.

According to the first aspect, in a possible implementation, the method further includes: receiving indication information, where the indication information is used to determine the amplification gain of the to-be-forwarded signal.

Based on this, the relay device may indicate the amplification gain of the to-be-forwarded signal to the relay device based on the indication information by using the access network device. In this way, the relay device may determine the amplification gain of the to-be-forwarded signal without calculation, thereby lowering the implementation complexity of the relay device.

According to a second aspect, a signal forwarding method is provided. The method includes: sending a measurement signal, where the measurement signal is used to determine an amplification gain of a to-be-forwarded signal, and the measurement signal corresponds to the to-be-forwarded signal; and sending the to-be-forwarded signal.

According to the second aspect, in a possible implementation, the to-be-forwarded signal is carried on a time-frequency resource. The time-frequency resource corresponds to the measurement signal. Sending the to-be-forwarded signal includes: sending, on the time-frequency resource, the to-be-forwarded signal.

According to the second aspect, in a possible implementation, the method further includes: sending error vector magnitude EVM indication information.

According to the second aspect, in a possible implementation, the measurement signal is indicated by using at least one of the following signalings: RRC, a MAC-CE, and DCI.

According to the second aspect, in a possible implementation, the EVM is indicated by at least one of the signalings.

According to the second aspect, in a possible implementation, the method further includes: receiving the amplification gain.

According to the second aspect, in a possible implementation, the method further includes: sending indication information, where the indication information is used to determine the amplification gain of the to-be-forwarded signal.

According to a third aspect, a communication apparatus is provided. The communication apparatus includes a communication unit and a processing unit. The communication unit is configured to receive a to-be-forwarded signal. The processing unit is configured to amplify the to-be-forwarded signal based on an amplification gain of the to-be-forwarded signal. The amplification gain of the to-be-forwarded signal is determined by measuring a measurement signal. The measurement signal corresponds to the to-be-forwarded signal. The communication unit is further configured to forward an amplified to-be-forwarded signal.

According to the third aspect, in a possible implementation, the to-be-forwarded signal is carried on a time-frequency resource. The time-frequency resource corresponds to the measurement signal. The processing unit is specifically configured to indicate the communication unit to receive a signal carried on the time-frequency resource. The processing unit is specifically configured to determine, based on a correspondence between the time-frequency resource and the measurement signal, the amplification gain determined by measuring the measurement signal, and amplify, based on the amplification gain, the signal carried on the time-frequency resource.

According to the third aspect, in a possible implementation, the communication unit is further configured to receive the measurement signal. The processing unit is further configured to measure the measurement signal to determine the amplification gain.

According to the third aspect, in a possible implementation, the processing unit is specifically configured to measure the measurement signal to determine a receive quality, and determine the amplification gain based on the receive quality and the target transmit quality.

According to the third aspect, in a possible implementation, the processing unit is specifically configured to determine the amplification gain based on the receive quality and target transmit quality corresponding to an EVM.

According to the third aspect, in a possible implementation, the measurement signal is indicated by using at least one of the following signalings: RRC, a MAC-CE, and DCI.

According to the third aspect, in a possible implementation, the EVM is indicated by at least one of the signalings.

According to the third aspect, in a possible implementation, the communication unit is further configured to report the amplification gain.

According to the third aspect, in a possible implementation, the communication unit is further configured to receive indication information, where the indication information is used to determine the amplification gain of the to-be-forwarded signal.

According to a fourth aspect, a communication apparatus is provided. The communication apparatus includes a communication unit and a processing unit. The processing unit is configured to indicate the communication unit to send a measurement signal. The measurement signal is used to determine an amplification gain of a to-be-forwarded signal. The measurement signal corresponds to the to-be-forwarded signal. The processing unit is configured to indicate the communication unit to send the to-be-forwarded signal.

According to the fourth aspect, in a possible implementation, the to-be-forwarded signal is carried on a time-frequency resource. The time-frequency resource corresponds to the measurement signal. The processing unit is specifically configured to indicate the communication unit to send, on the time-frequency resource, the to-be-forwarded signal.

According to the fourth aspect, in a possible implementation, the processing unit is further configured to indicate the communication unit to send error vector magnitude EVM indication information.

According to the fourth aspect, in a possible implementation, the measurement signal is indicated by using at least one of the following signalings: RRC, a MAC-CE, and DCI.

According to the fourth aspect, in a possible implementation, the EVM is indicated by at least one of the signalings.

According to the fourth aspect, in a possible implementation, the processing unit is further configured to indicate the communication unit to receive the amplification gain.

According to the fourth aspect, in a possible implementation, the processing unit is further configured to indicate the communication unit to send indication information, where the indication information is used to determine the amplification gain of the to-be-forwarded signal.

According to a fifth aspect, this application provides a communication apparatus. The communication apparatus includes a processor and a memory. The memory includes instructions. When the instructions are run by the processor, the apparatus is enabled to perform the method described in any one of the first aspect or the possible implementations of the first aspect.

According to a sixth aspect, this application provides a computer-readable storage medium. The computer-readable storage medium includes a computer program or instructions. When the computer program or the instructions are run on a computer, the computer is enabled to perform the method described in any one of the first aspect or the possible implementations of the first aspect.

According to a seventh aspect, this application provides a computer-readable storage medium. The computer-readable storage medium includes a computer program or instructions. When the computer program or the instructions are run on a computer, the computer is enabled to perform the method described in any one of the second aspect or the possible implementations of the second aspect.

According to an eighth aspect, this application provides a computer program product including instructions. When the computer program product runs on a computer, the computer is enabled to perform the method described in any one of the first aspect or the possible implementations of the first aspect.

According to a ninth aspect, this application provides a computer program product including instructions. When the computer program product runs on a computer, the computer is enabled to perform the method described in any one of the second aspect or the possible implementations of the second aspect.

According to a tenth aspect, this application provides a computer program product including instructions. When the computer program product runs on a computer, the computer is enabled to perform the method described in any one of the third aspect or the possible implementations of the third aspect.

According to an eleventh aspect, this application provides a computer program product including instructions. When the computer program product runs on a computer, the computer is enabled to perform the method described in any one of the fourth aspect or the possible implementations of the fourth aspect.

According to a twelfth aspect, this application provides a communication system. The communication system includes the communication apparatus described in the third aspect and the communication apparatus described in the fourth aspect.

It should be understood that descriptions of technical features, technical solutions, beneficial effects, or similar languages in this application do not imply that all features and advantages can be implemented in any single embodiment. On the contrary, it may be understood that descriptions of features or beneficial effects indicate that at least one embodiment includes specific technical features, technical solutions, or beneficial effects. Therefore, descriptions of technical features, technical solutions, or beneficial effects in this specification do not necessarily refer to a same embodiment. Further, the technical features, technical solutions, and beneficial effects described in embodiments may be combined in any proper manner. A person skilled in the art may understand that an embodiment may be implemented without one or more specific technical features or technical solutions, or beneficial effect in a specific embodiment. In other embodiments, additional technical features and beneficial effects may also be identified in specific embodiments that do not reflect all embodiments.

DESCRIPTION OF EMBODIMENTS

In descriptions of this application, unless otherwise specified, "/" means "or". For example, A/B may indicate A or B. A term "and/or" in this specification describes only a correspondence between associated objects and indicates that there may be three relationships. For example, A and/or B may indicate the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, terms such as "an example" or "for example" are used to represent giving an example, an illustration, or a description. Any embodiment or design scheme described as an "example" or "for example" in this application should not be understood as being more preferred or having more advantages than another embodiment or design scheme. As such, use of the terms such as "example" or "for example" is intended to present a relative concept in a specific manner.

The signal forwarding method provided in this embodiment of this application is used to determine an amplification gain of a to-be-forwarded signal, to amplify and forward the to-be-forwarded signal.

It should be noted that, in this application, a gain of a signal may be specifically a gain of a signal power. For example, an amplification gain of the signal may be amplifying the power of a signal.

Figure 1:
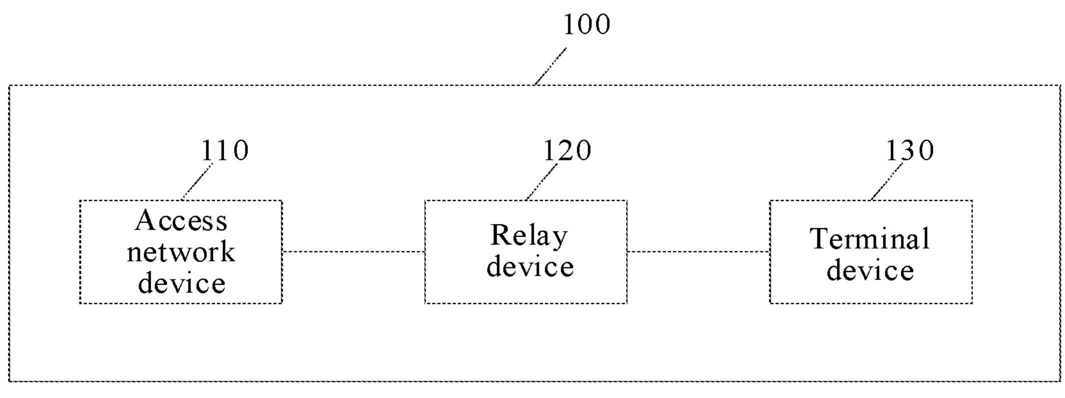
FIG. 1 is a system architecture diagram of a communication system according to an embodiment of this application.

As shown in FIG. 1, the signal forwarding method provided in this embodiment of this application may be applied to a communication system 100 shown in FIG. 1. As shown in FIG. 1, the communication system 100 includes an access network device 110, a relay device 120, and a terminal device 130.

The access network device 110 is configured to send a downlink signal to the relay device 120 or the terminal device 130. Alternatively, the access network device is configured to receive an uplink signal from the relay device 120 or the terminal device 130.

The relay device 120 is configured to receive a to-be-forwarded signal, amplify a transmit power of the to-be-forwarded signal, and forward an amplified to-be-forwarded signal. For example, the relay device 120 is configured to receive a downlink signal from the access network device 110, amplify a transmit power of the downlink signal, and send an amplified downlink signal to the terminal device 130. Alternatively, the relay device 120 is configured to receive an uplink signal from the terminal device 130, amplify a transmit power of the uplink signal, and send an amplified uplink signal to the access network device 110.

The terminal device 130 is configured to receive a downlink signal from the access network device 110 or the relay device 120. Alternatively, the terminal device 130 is configured to send an uplink signal to the access network device 110 or the relay device 120.

The communication system in embodiments of this application includes but is not limited to a long term evolution (LTE) system, a 5$^{th}$ generation (5G) system, a new radio (NR) system, a wireless local area network (WLAN) system and a future evolved system, or a plurality of converged communication systems. The 4G system may also be referred to as an evolved packet system (EPS). A core network of a 4G system may be referred to as an evolved packet core (EPC) network, and an access network may be referred to as a long term evolution (LTE). A core network of a 5G system may be referred to as a 5GC (5G core), and an access network may be referred to as a new radio (NR). For ease of description, the following uses an example in which this application is applied to the 5G system to describe this application. However, it may be understood that this application is also applicable to the 4G system, a 3$^{rd}$ generation (3G) system, and the like, and this is not limited. For example, the method provided in this embodiment of this application may be specifically applied to an evolved universal terrestrial radio access network (E-UTRAN) and a next generation radio access network (NG-RAN) system.

The access network device in embodiments of this application is an entity on a network side that is configured to send a signal, or receive a signal, or send a signal and receive a signal. The access network device may be an apparatus deployed in a radio access network (RAN) and that provides a wireless communication function for a terminal. For example, the access network device may be a transmission reception point (TRP), a base station (for example, an evolved NodeB (eNB or eNodeB), a next generation node base station (gNB), a next generation eNB (ng-eNB), or the like), various forms of control nodes (for example, a network controller, a radio controller (for example, a radio controller in a cloud radio access network (CRAN) scenario)), a roadside unit (RSU), or the like. Specifically, the access network device may be a macro base station, a micro base station (also referred to as a small cell), a relay station, an access point (AP), or the like in various forms, or may be an antenna panel of a base station. The control node may be connected to a plurality of base stations, and configure resources for a plurality of terminals covered by the plurality of base stations. In systems using different radio access technologies (RATs), names of devices having a base station function may be different. For example, the base station may be referred to as an eNB or an eNodeB in an LTE system, and may be referred to as a gNB in a 5G system or an NR system. A specific name of the base station is not limited in this application. Alternatively, the access network device may be an access network device or the like in a future evolved public land mobile network (PLMN).

The terminal device in embodiments of this application is an entity on a user side that is configured to receive a signal, or send a signal, or receive a signal and send a signal. The terminal device is configured to provide one or more of a voice service and a data connectivity service for a user. The terminal device may also be referred to as user equipment (UE), a terminal, an access terminal, a subscriber unit, a subscriber station, a mobile station, a remote station, a remote terminal, a mobile device, a user terminal, a wireless communication device, a user agent, or a user apparatus. The terminal device may be a vehicle-to-everything (V2X) device, for example, a smart car (or intelligent car), a digital car, an unmanned car (unmanned car, driverless car, pilotless car, or automobile), a self-driving car (or autonomous car), a pure electric vehicle (pure EV or Battery EV), a hybrid electric vehicle (HEV), a range extended electric vehicle (REEV), a plug-in hybrid electric vehicle (PHEV), or a new energy vehicle. The terminal device may also be a device-to-device (D2D) device, for example, an electricity meter or a water meter. Alternatively, the terminal device may be a mobile station (MS), a subscriber unit, an unmanned aerial vehicle, an internet of things (IoT) device, a station (ST) in a WLAN, a cellular phone, a smartphone, a cordless telephone set, a wireless data card, a tablet computer, a session initiation protocol (SIP) phone, a wireless local loop (WLL) station, a personal digital assistant (PDA) device, a laptop computer, a machine type communication (MTC) terminal, a handheld device with a wireless communication function, a computing device, another processing device connected to a wireless modem, a vehicle-mounted device, or a wearable device (which may also be referred to as a wearable intelligent device). Alternatively, the terminal device may be a terminal device in a next-generation communication system, for example, a terminal device in a 5G system, a terminal device in a future evolved PLMN, or a terminal device in an NR system.

To make this application clearer, some concepts in this application are first briefly described.

1. Relay

Relay is a technology for amplifying a signal and forwarding an amplified signal. A relay process is performed by a relay device. The relay device generally includes a receive antenna, a transmit antenna, and a repeater.

Figure 2:
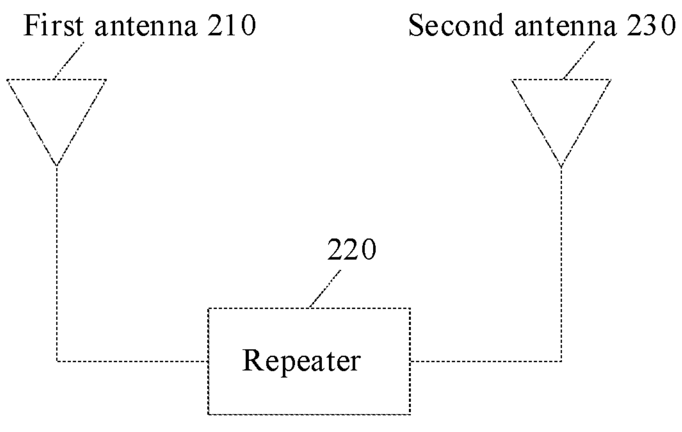
FIG. 2 is a schematic diagram of a structure of a relay device according to an embodiment of this application.

For example, as shown in FIG. 2, an embodiment of this application provides a schematic diagram of a structure of a relay device 200 (for example, a low-frequency repeater or a low-frequency relay device). The relay device includes a first antenna 210, a repeater 220, and a second antenna 230.

The first antenna 210 and the second antenna 230 are configured to receive and send signals. The repeater 220 has a signal power amplifying circuit, configured to perform power amplification on a signal. In this embodiment of this application, the first antenna 210 and the second antenna 230 may be antennas or antenna arrays. This is not limited in this application.

When the relay device 200 forwards a downlink signal, the first antenna 210 is configured to receive the downlink signal from an access network device, and sends the downlink signal to the repeater 220. The repeater 220 is configured to perform power amplification on the downlink signal, and send a power-amplified downlink signal to the second antenna 230. The second antenna 230 is configured to receive the power-amplified downlink signal from the repeater 220, and send the power-amplified downlink signal to a terminal device.

When the relay device 200 forwards an uplink signal, the second antenna 230 is configured to receive an uplink signal from the terminal device, and send the uplink signal to the repeater 220. The repeater 220 is configured to perform power amplification on the uplink signal, and send a power-amplified uplink signal to the first antenna 210. The first antenna 210 is configured to receive the power-amplified uplink signal from the repeater 220, and send the power-amplified uplink signal to the access network device.

When amplifying a signal, the relay device 200 needs to select a suitable amplification gain to amplify the signal, to improve transmission performance of the signal.

If the relay device 200 amplifies the downlink signal by using an excessively large amplification gain, a component of the relay device 200 may be saturated, and quality of a signal forwarded by the relay device 200 deteriorates, severely affecting forwarding performance of the relay device 200. In an extreme case, signal quality deterioration may cause the terminal device to be unable to correctly demodulate data.

If the relay device 200 amplifies the downlink signal by using an excessively small amplification gain, the power of a signal forwarded by the relay device 200 may be relatively low, and a received signal-to-noise ratio at the terminal device is relatively low. In other words, a coverage improvement capability of the relay device 200 is insufficient.

A process in which the relay device amplifies a signal includes: The relay device determines an amplifying power of a received signal based on information such as a difference between a target transmit power of the signal and a receive power of the signal and a working capability of a component of the relay device. The relay device amplifies the signal based on the determined amplifying power, and sends an amplified signal.

The current relay methods mainly include: 1.1 amplify-and-forward (AF) relay; and 1.2 decode-and-forward (DF) relay. The following are described separately.

1.1 AF Relay

AF relay is a relay technology in which, after receiving a signal from another device, a relay device directly amplifies a to-be-forwarded signal and forwards an amplified to-be-forwarded signal.

In an AF relay process, after receiving a signal, the relay device directly amplifies the signal without parsing the signal. Therefore, the AF relay has an advantage of a low forwarding delay. In addition, an AF relay device does not need to parse a signal. Therefore, implementation of the AF relay device is simple, and device costs are low.

It should be noted that, in a process in which the AF relay amplifies a signal, noise and interference of the signal are also amplified when the signal is amplified.

Currently, the AF relay devices include: a repeater, radio frequency (RF) relay, layer 1 (L1) relay, L1-integrated access and backhaul (IAB), layer 0 (L0)-IAB, RE-IAB, an amplifier, a repeater, intelligent repeater (smart repeater), and the like.

The signal from the other device may be a downlink signal sent by an access network device, an uplink signal sent by a terminal device, or a signal of another type. This is not limited in this application.

1.2 DF Relay

A decode-and-forward relay technology is a technology in which a relay device first decodes a signal after receiving the signal from another device. After decoding, the signal is re-encoded. The relay device forwards the re-encoded signal.

In a DF relay process, because the relay device decodes a signal and re-encodes a decoded signal, it may eliminate or reduce interference and noise in the signal. This avoids amplification of interference and noise in the signal, and improves a transmission quality of the signal.

Currently, an IAB node, the UE relay, and the like in new radio (NR) perform amplification and forwarding of a signal in a DF relay manner.

2. Beam

A beam is a communication resource. The beam may be a wide beam, a narrow beam, or another type of beam. A technology for forming a beam may be a beamforming technology or another technical means. The beamforming technology may be specifically a digital beamforming technology, an analog beamforming technology, or a hybrid digital/analog beamforming technology. Different beams may be considered as different resources. The same information or different information may be sent by using different beams. Optionally, a plurality of beams having a same or similar communication feature may be considered as one beam. One beam may include one or more antenna ports, configured to transmit a data channel, a control channel, a sounding signal, and the like. For example, a transmit beam may refer to a signal strength distribution formed in different spatial directions after a signal is sent by using an antenna, and a receive beam may refer to a signal strength distribution of a radio signal received from an antenna in different spatial directions. It may be understood that one or more antenna ports forming one beam may also be considered as one antenna port set.

Beams may be classified into a transmit beam and a receive beam of an access network device, and a transmit beam and a receive beam of a terminal device. The transmit beam of the access network device is used to describe beamforming information on a transmit side of the access network device. The receive beam of the access network device is used to describe beamforming information on a receive side of the access network device. The transmit beam of the terminal device is used to describe beamforming information on a transmit side of the terminal device. The receive beam of the terminal device is used to describe beamforming information on a receive side of the terminal device. That is, the beam is used to describe beamforming information.

In a current NR protocol, beam information may be indicated by using an antenna port quasi co-location (QCL) relationship. Specifically, indication information (for example, downlink control information (DCI)) may indicate that a QCL relationship exists between one resource (or an antenna port) and another resource (or an antenna port), to indicate that beams corresponding to the two resources (or antenna ports) have a same spatial characteristic, and a same receive beam may be used for receiving. In a protocol, a beam may be specifically represented by using identifiers of various signals, for example, a resource index of a channel state information reference signal (CSI-RS), an index of a synchronization signal broadcast channel block (SS/PBCH block, or SSB), a resource index of a sounding reference signal (SRS), and a resource index of a tracking reference signal (TRS).

The beam may correspond to one or more of a time resource, a space resource, and a frequency domain resource.

The beam may also correspond to a reference signal resource (for example, a reference signal resource of beamforming) or beamforming information.

The beam may further correspond to information associated with a reference signal resource of the access network device. The reference signal may be a CSI-RS, an SSB, a demodulation reference signal (DMRS), a phase tracking reference signal (PTRS), a TRS, or the like. The information associated with a reference signal resource may be a reference signal resource identifier, QCL information (especially type D QCL), or the like. The reference signal resource identifier corresponds to a transmit/receive beam pair previously established during measurement based on the reference signal resource. The terminal device may deduce beam information by using an index of the reference signal resource.

The beam is classified into a broadcast beam and a unicast beam.

The broadcast beam is a cell-level beam, and is a beam used by the access network device to send a broadcast signal. The broadcast signal may include but is not limited to an SS/PBCH block, a system information block (SIB) 1-physical downlink shared channel (PDSCH), a SIB 1-physical downlink control channel (PDCCH), and the like. Generally, the access network device sends a broadcast signal by scanning several (for example, 8, 16, or 32) pre-designed beams. These beams are used to cover a coverage area of an entire cell.

The unicast beam is a user-level beam, and is a beam used by the access network device to send a unicast signal to the terminal device or the relay device. The unicast signal includes but is not limited to a PDSCH, a user-level CSI-RS, and the like. Because the unicast beam is specific to a specific user, generally, the unicast beam has a higher beam gain than the broadcast beam.

3. QCL Relationship

A QCL relationship may also be referred to as QCL mapping, QCL correspondence, and QCL related. When there is a QCL relationship between two signals, at least one of a same delay spread, a same Doppler spread, a same average gain, a same average delay, and a same spatial domain parameter may be selected to send or receive a signal, and a same or similar beam is selected to send or receive a signal.

A QCL relationship parameter includes at least one of a Doppler spread, a Doppler frequency shift, an average delay, a delay spread, and a spatial receive parameter. A QCL relationship of each downlink reference signal (DL RS) may be determined by using a higher-layer parameter "QCL-Type" in QCL info. The QCL-Type includes the following types:

'QCL-TypeA': {Doppler shift, Doppler spread, average delay, delay spread} ("QCL-TypeA": {a Doppler frequency shift, Doppler spread, an average delay, delay spread});

'QCL-TypeB': {Doppler shift, Doppler spread} ("QCL-TypeB": {a Doppler frequency shift, Doppler spread});

'QCL-TypeC': {Doppler shift, average delay} ("QCL-TypeC": {a Doppler frequency shift, an average delay}); and 'QCL-TypeD': {Spatial Rx parameter} ("QCL-TypeD": {a spatial receive parameter}).

The QCL relationship between reference signals may be determined by a protocol or configured by an access network device. For example, the access network device configures a QCL relationship parameter between two reference signal resources as "QCL-TypeD", indicating that there may be a correspondence between spatial receive parameters of the two reference signals received by UE or a relay device.

4. CSI-RS

A CSI-RS may be used to evaluate received signal quality. A beam may correspond to a CSI-RS resource. A terminal device may determine receive quality of the CSI-RS resource by measuring and evaluating the CSI-RS resource. The terminal device reports, to an access network device, the quality of the CSI-RS resource obtained through measurement and evaluation. The access network device may determine quality of the beam based on the quality of the CSI-RS resource and a correspondence between the beam and the CSI-RS resource.

To determine quality of the beam, the access network device needs to send measurement configuration information to the terminal device. The measurement configuration information mainly includes two parts: resource configuration information and reporting configuration information.

The resource configuration information is information related to a measurement resource, and is configured by using a three-level structure (resource configuration resourceConfig-resource set resourceSet-resource resource) in the protocol. The access network device may configure one or more resource configurations for the terminal device. Each resource configuration includes one or more resource sets. Each resource set may include one or more resources. Each resource configuration/resource set/resource includes an index of its own. In addition, some other parameters are further included, for example, a resource periodicity and a QCL type corresponding to the resource.

5. SSB

An SSB includes at least one of a primary synchronization signal (PSS), a secondary synchronization signal (SSS), and a physical broadcast channel (PBCH). The SSB may be used for time-frequency tracking, beam management, link monitoring, radio resource measurement, and the like.

The foregoing briefly describes some concepts in embodiments of this application.

With reference to the foregoing description of the relay, it can be learned that in an AF relay process, a relay device can determine, based on a receive power of a signal and a target transmit power, an amplifying power for amplifying the signal only after determining the receive power of the signal. Based on this, the relay device needs to measure the receive power of the signal after receiving the signal. However, in some current communication networks (for example, a communication network with a medium frequency and a high frequency), an access network device may send a downlink signal by using different beams and/or different bandwidths. When the access network device sends downlink signals by using different beams and/or bandwidths, the powers of the downlink signals received by the relay device are different. The difference in the powers of the downlink signals causes the relay device to be unable to select a suitable amplifying power for the downlink signals to amplify the downlink signals.

In addition, after receiving the downlink signal, the relay device measures the downlink signal to determine a receive power of the downlink signal. This process needs a relatively long time (at least a time of several symbols is required), but a delay requirement for forwarding the signal by the relay device is relatively high (usually at a nanosecond level). If the relay device measures the downlink signal after receiving the downlink signal, to determine an amplifying power of the downlink signal, after the relay device determines the amplification gain of the downlink signal, the downlink signal may have transmitted one or more symbols. Consequently, the relay device cannot completely forward the signal.

To resolve a problem in conventional technologies that a relay device cannot select a suitable amplification gain or suitable amplifying power for a downlink signal to amplify the downlink signal, an embodiment of this application provides a signal forwarding method. After receiving a to-be-forwarded signal, the relay device amplifies the to-be-forwarded signal based on an amplification gain of the to-be-forwarded signal and forwards an amplified to-be-forwarded signal. The amplification gain is determined by measuring a measurement signal, and the measurement signal corresponds to the to-be-forwarded signal. Based on this, the relay device determines the amplification gain of the to-be-forwarded signal by measuring the measurement signal, thereby resolving a problem in conventional technologies that the relay device cannot select a suitable amplifying power to amplify a downlink signal.

Figure 3:
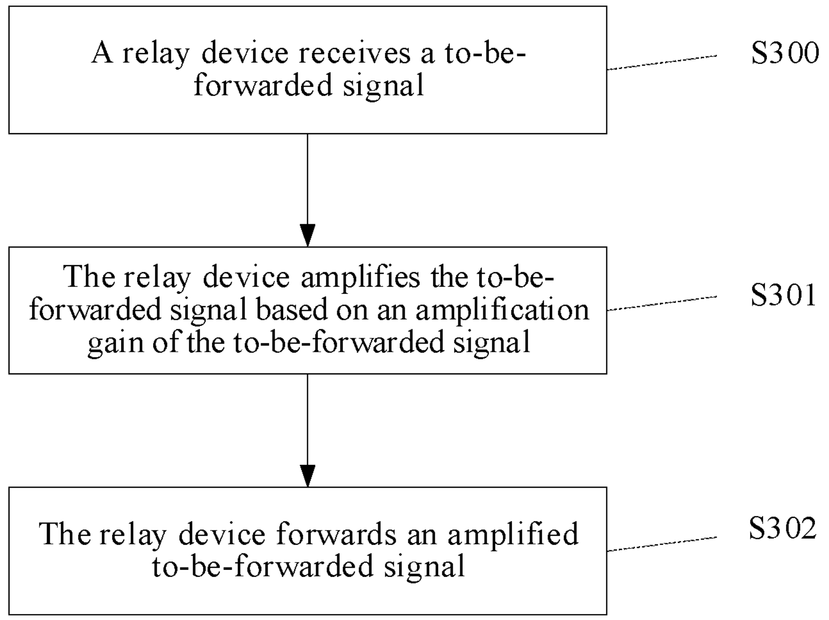
FIG. 3 is a schematic flowchart of a signal forwarding method according to an embodiment of this application.

As shown in FIG. 3, the signal forwarding method provided in this embodiment of this application includes the following steps.

S300. A relay device receives a to-be-forwarded signal.

The to-be-forwarded signal is a signal that is received by the relay device and that needs to be amplified and forwarded. An amplification gain of the to-be-forwarded signal is used to represent a circuit gain and/or an array gain of amplifying the to-be-forwarded signal by the relay device, and the like.

In a possible implementation, the to-be-forwarded signal may be any one of the following: an uplink signal, a downlink signal, or a sidelink signal. In this embodiment of this application, an example in which the to-be-forwarded signal received by the relay device is a downlink signal sent by an access network device to the relay device is used for description.

When the to-be-forwarded signal is a downlink signal, the relay device receives the downlink signal from the access network device by using a backhaul beam, and the relay device forwards an amplified downlink signal to the terminal device by using an access beam. The backhaul beam is a beam used by the relay device to receive a signal from the access network device, or a beam used by the relay device to send a signal to the access network device. The backhaul beam may be determined by beam training. The access beam is a beam used by the relay device to receive a signal from the terminal device, or a beam used by the relay device to send a signal to the terminal device.

When the to-be-forwarded signal is an uplink signal, the relay device receives an uplink signal from the terminal device by using the access beam, and the relay device sends an amplified uplink signal to the access network device by using the backhaul beam.

The amplification gain of the to-be-forwarded signal may be determined based on forwarding (or amplification) information of the to-be-forwarded signal that is determined by the relay device. The forwarding information of the to-be-forwarded signal includes, for example, but is not limited to, information such as amplification and forwarding gain information of the to-be-forwarded signal, access beam information of the to-be-forwarded signal, and backhaul beam information of the to-be-forwarded signal.

S301. The relay device amplifies the to-be-forwarded signal based on the amplification gain of the to-be-forwarded signal, where the amplification gain of the to-be-forwarded signal is determined by measuring a measurement signal, and the measurement signal corresponds to the to-be-forwarded signal.

The measurement signal may be, for example, but is not limited to, a signal configured by the access network device for the relay device that is used for downlink measurement.

Optionally, the measurement signal is indicated by using at least one signaling message in radio resource control (RRC) signaling, a media access control-control element (MAC-CE), and DCI.

Specifically, the relay device amplifies the to-be-forwarded signal based on the amplification gain, so that an increased value of the power of the to-be-forwarded signal is an amplification gain value. During implementation, the relay device may perform power amplification on the to-be-forwarded signal by using a component such as a power amplifier.

In embodiments of this application, the to-be-forwarded signal and the measurement signal may be signals of a same type. For example, both the to-be-forwarded signal and the measurement signal are data signals; or both the to-be-forwarded signal and the measurement signal are SSBs; or both the to-be-forwarded signal and the measurement signal are CSI-RSs. The to-be-forwarded signal and the measurement signal may alternatively be other types of signals. This is not limited in this application.

In addition, the to-be-forwarded signal and the measurement signal may alternatively be different types of signals. For example, the to-be-forwarded signal is a CSI-RS, and the measurement signal is an SSB. Alternatively, the to-be-forwarded signal is an SSB, and the measurement signal is a CSI-RS. Alternatively, the to-be-forwarded signal is a PDSCH, and the measurement signal is an SSB. The to-be-forwarded signal and the measurement signal may alternatively be other types of signals. This is not limited in this application.

S302. The relay device forwards an amplified to-be-forwarded signal.

Based on the foregoing technical solutions, an embodiment of this application provides a signal forwarding method. After receiving a to-be-forwarded signal, a relay device amplifies the to-be-forwarded signal based on an amplification gain of the to-be-forwarded signal and forwards an amplified to-be-forwarded signal. The amplification gain is determined by measuring a measurement signal. The measurement signal corresponds to the to-be-forwarded signal. In this way, the relay device determines the amplification gain of the to-be-forwarded signal by measuring the measurement signal, thereby resolving a problem in conventional technologies that the relay device cannot select a suitable amplifying power to amplify a downlink signal.

In addition, in the signal forwarding method provided in this embodiment of this application, the relay device may measure the measurement signal in advance to determine the amplification gain of the to-be-forwarded signal. After receiving the to-be-forwarded signal, the relay device amplifies the to-be-forwarded signal based on the amplification gain of the to-be-forwarded signal and forwards an amplified to-be-forwarded signal. This can prevent a problem that the relay device cannot completely forward the to-be-forwarded signal caused by a measurement performed when the to-be-forwarded signal is received.

Figure 4:
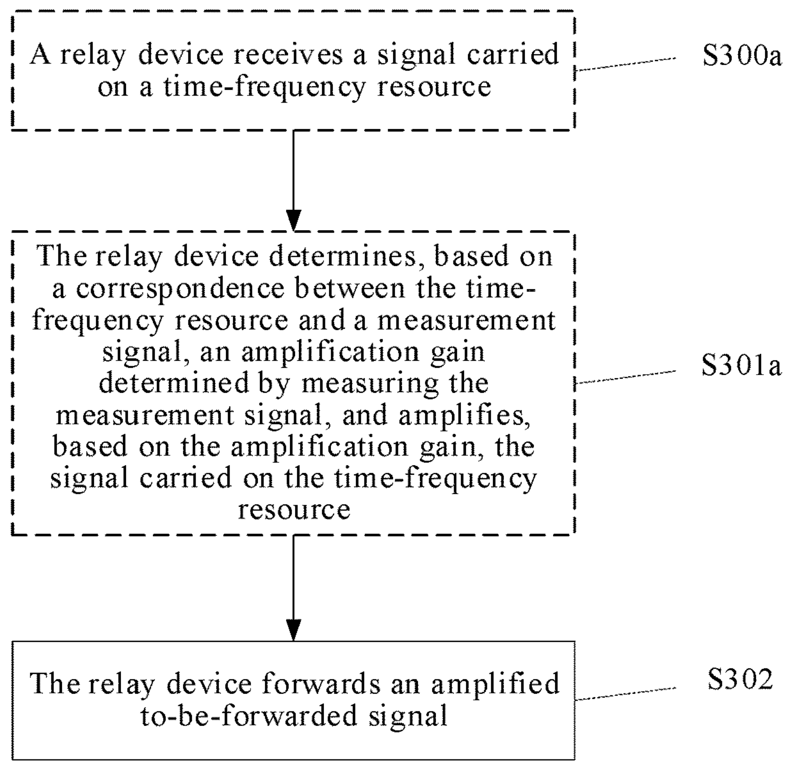
FIG. 4 is a schematic flowchart of a signal forwarding method according to an embodiment of this application.

In a possible implementation, the to-be-forwarded signal is carried on a time-frequency resource. The time-frequency resource corresponds to the measurement signal. In this case, with reference to FIG. 3, the foregoing S300 may be implemented by using the following S300*a*, and the foregoing S301 may be implemented by using the following S301*a*, as shown in FIG. 4.

S300*a*. The relay device receives a signal carried on the time-frequency resource.

Specifically, the access network device indicates the time-frequency resource to the relay device. The time-frequency resource is a time-frequency resource used by the access network device to send a downlink signal. A signal received by the relay device on the time-frequency resource is a to-be-forwarded signal.

In this case, in addition to the downlink signal sent by the access network device on the time-frequency resource, the to-be-forwarded signal received by the relay device may further include at least one of interference and noise on the time-frequency resource. In some cases, if the access network does not send a downlink signal to the relay device on the time-frequency resource, the signal received by the relay device includes only interference and noise.

S301*a*. The relay device determines, based on a correspondence between the time-frequency resource and the measurement signal, an amplification gain determined by measuring the measurement signal, and amplifies, based on the amplification gain, the signal carried on the time-frequency resource.

Specifically, the relay device measures the measurement signal to determine the amplification gain. The relay device associates, with the time-frequency resource based on the correspondence between the time-frequency resource and the measurement signal, the amplification gain determined by measuring the measurement signal.

After the time-frequency resource is associated with the amplification gain, the relay device receives, on the time-frequency resource, the to-be-forwarded signal, and amplifies the to-be-forwarded signal based on the amplification gain associated with the time-frequency resource.

The foregoing describes a process in which the relay device receives the to-be-forwarded signal, and amplifies the to-be-forwarded signal and forwards an amplified to-be-forwarded signal.

The following specifically describes the signal forwarding method provided in this embodiment of this application by using an interaction process between the relay device and the access network device when the relay device forwards a downlink signal as an example.

Figure 5:
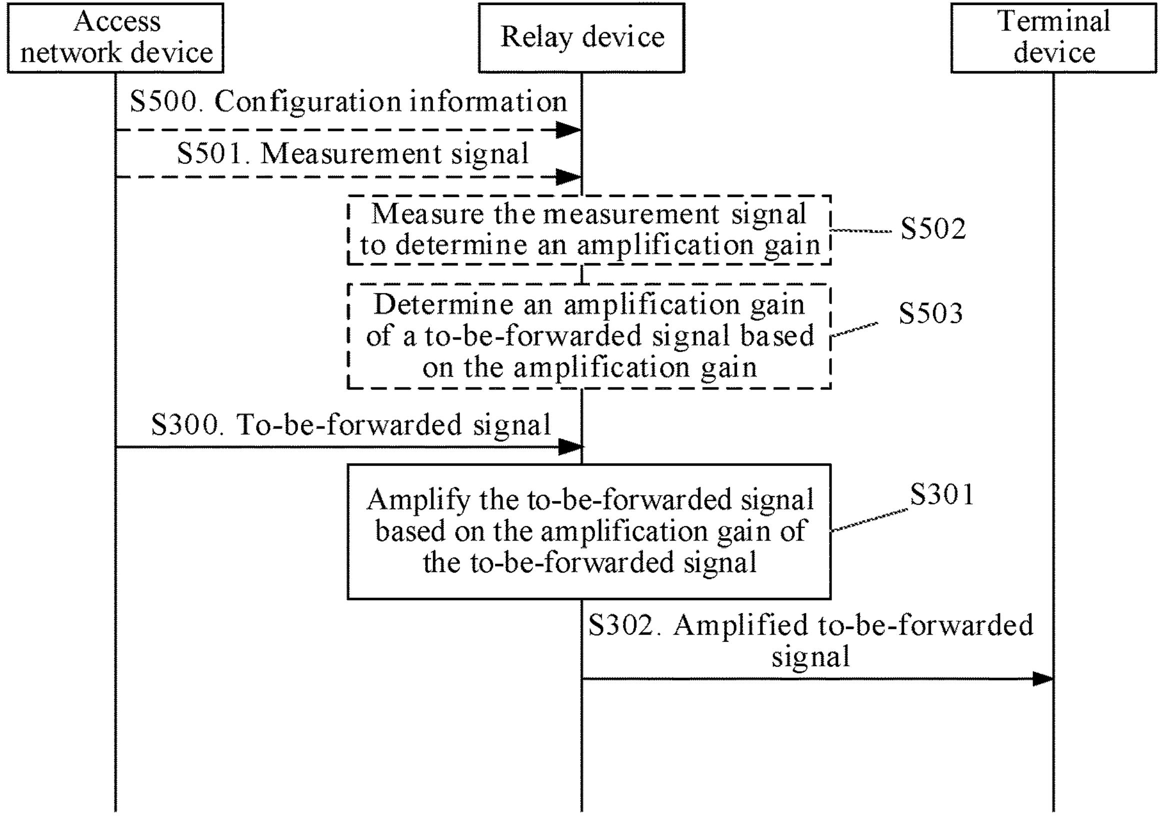
FIG. 5 is a schematic flowchart of a signal forwarding method according to an embodiment of this application.

With reference to FIG. 3, and as shown in FIG. 5, before S300, the signal forwarding method provided in this embodiment of this application includes the following S500 to S503.

S500. An access network device sends configuration information to a relay device. Correspondingly, the relay device receives the configuration information from the access network device. The configuration information is used to configure a measurement signal.

The following separately describes the measurement signal, the configuration information, and a process in which the access network device configures the measurement signal for the relay device by using the configuration information.

(a) Measurement Signal

The measurement signal is a signal configured by the access network device for the relay device that is used to measure the receive quality of a signal sent by the access network device. In this embodiment of this application, the measurement signal may be a reference signal or a channel configured by the access network device for the relay device. For example, the measurement signal is a CSI-RS, an SSB, or the like configured by the access network device for the relay device. In this case, the relay device may determine, by measuring a reference signal, the receive quality of a signal sent by the access network device, for example, a receive signal power.

Alternatively, the measurement signal may be a time domain resource configured by the access network device for the relay device. In this case, the relay device receives a signal on the time domain resource, and measures the received signal to determine a receive power of the signal.

The access network device may configure a plurality of measurement signals for the relay device. The plurality of measurement signals may correspond to different to-be-forwarded signals.

For example, the access network device configures a first measurement signal and a second measurement signal for the relay device. The first measurement signal corresponds to a first to-be-forwarded signal. The second measurement signal corresponds to a second to-be-forwarded signal.

In this case, the relay device may measure the first measurement signal to determine an amplification gain of the first to-be-forwarded signal. The relay device may measure the second measurement signal to determine an amplification gain of the second to-be-forwarded signal.

(b) Configuration Information

Configuration information is information sent by an access network device to a relay device that is used to configure a measurement signal for the relay device. The configuration information includes at least one instance of the following information: a time domain periodicity, a time domain offset, time domain duration, transmission configuration indicator (TCI) information, QCL information, and frequency domain information (a bandwidth, a frequency domain density, and a frequency domain position). The QCL information may include at least one of the following: a QCL type A, a QCL type B, a QCL type C, and a QCL type D.

The access network device may configure one or more measurement signals for the relay device by using the configuration information. For example, the access network device may configure two measurement signals for the relay device by using the configuration information. Alternatively, the access network device may configure three measurement signals for the relay device by using the configuration information. Alternatively, the access network device may configure four measurement signals for the relay device by using the configuration information. Alternatively, the access network device may configure eight measurement signals for the relay device by using the configuration information. The one or more measurement signals may be measurement signals of a same type, or may be measurement signals of different types. This is not limited in this application.

In a possible implementation, the relay device obtains one or more instances of channel and reference signal information, and then the access network device configures or indicates some of the channels or signals as the measurement signal. For example, the relay device obtains SSB information and CSI-RS information, including SSB sending location information, CSI-RS configuration information, and the like. The access network device indicates an SSB index and/or a CSI-RS identifier to the relay device, and configures a corresponding SSB and/or CSI-RS as a measurement signal.

(c) A Process in which the Access Network Device Configures the Measurement Signal for the Relay Device by Using the Configuration Information.

The access network device may configure the measurement signal for the relay device by using one or more signaling messages, including but not limited to RRC, a MAC-CE, and DCI.

A method in which the access network device configures the measurement signal for the relay device by sending the configuration information to the relay device includes at least the following example 1 to example 4.

Example 1: The configuration information sent by the access network device to the relay device is carried in the RRC sent by the access network device to the relay device. The RRC includes configuration information of the measurement signal, and is specifically used to configure the measurement signal. In a possible implementation, the configuration information of the measurement signal includes index information of an SSB and/or identification information of the CSI-RS.

Example 2: The configuration information sent by the access network device to the relay device is carried in the MAC-CE sent by the access network device to the relay device. The MAC-CE includes configuration information of the measurement signal, and is specifically used to configure the measurement signal.

Example 3: The configuration information sent by the access network device to the relay device is carried in the RRC. The access network device configures one or more measurement signals for the relay device by using the RRC. The one or more measurement signals are inactive measurement signals. Then, the access network device sends the MAC-CE to the relay device. The MAC-CE is used to activate the access network device to configure all or some of one or more measurement signals for the relay device by using the RRC.

Example 4: The configuration information sent by the access network device to the relay device is carried in the RRC. The access network device configures one or more measurement signals for the relay device by using the RRC. The one or more measurement signals are inactive measurement signals. Then, the access network device sends the MAC-CE to the relay device. The MAC-CE is used to activate the access network device to configure all or some of one or more measurement signals for the relay device by using the RRC. After the access network device activates all or some of the measurement signals by using the MAC-CE, the access network device sends a DCI to the relay device. The DCI indicates a to-be-measured measurement signal. The relay device measures the measurement signal based on an indication of the DCI.

S501. The access network device sends the measurement signal. Correspondingly, the relay device receives the measurement signal from the access network device.

In a possible implementation, after receiving the measurement signal, the relay device may amplify the measurement signal and forward an amplified measurement signal, so that a terminal device obtains the amplified measurement signal. In this case, the measurement signal is also used as a to-be-forwarded signal.

S502. The relay device measures the measurement signal to determine an amplification gain.

The amplification gain may be an amplification gain of the measurement signal.

In a possible implementation, measuring, by the relay device, the measurement signal to determine an amplification gain includes the following step one and step two.

Step one. The relay device measures the measurement signal to determine a receive quality of the measurement signal. Step two. The relay device determines the amplification gain based on the receive quality and target transmit quality.

The following separately describes step one and step two in detail.

Step one. The relay device measures the measurement signal to determine the receive quality of the measurement signal.

The receive quality of the measurement signal that is determined by the relay device includes at least receive power information of the measurement signal. Correspondingly, the relay device may measure a receive power of the measurement signal to determine the receive power of the measurement signal.

The receive power information of the measurement signal may be reference signal received power (RSRP) of the measurement signal, or a received signal strength indicator (RSSI) of the measurement signal. Alternatively, the received power of the measurement signal may be a full-bandwidth signal receive power of the measurement signal that is determined after the relay device performs time domain power measurement on the measurement signal. A type of the receive power of the measurement signal is not limited in this application.

Optionally, in a process in which the relay device measures the measurement signal, the relay device may measure the measurement signal based on the configuration information sent by the access network device. Alternatively, the relay device may further measure the measurement signal based on a signaling indication of the access network device. The signaling may be RRC, a MAC-CE, or DCI.

For example, with reference to the foregoing example 1, the relay device measures all or some measurement signals in the measurement signal configured by the access network device by using the RRC, to determine a receive quality of the measurement signal.

For example, with reference to the foregoing example 2, the relay device measures all or some measurement signals in the measurement signal configured by the access network device by using the MAC-CE, to determine the receive quality of the measurement signal.

For example, with reference to the foregoing example 3, the relay device measures the measurement signal activated by the MAC-CE, to determine the receive quality of an activated measurement signal.

For example, with reference to the foregoing example 4, the relay device measures the measurement signal indicated by the DCI, to determine the receive quality of the measurement signal indicated by the DCI.

Step two. The relay device determines the amplification gain based on the receive quality and target transmit quality.

The target transmit quality determined by the relay device includes at least a target transmit or forwarding power. The target transmit or forwarding power may be determined by the relay device, for example, by determining a capability of the relay device, or may be indicated by the access network device to the relay device. This is not limited in this application.

In a possible implementation, the relay device determines the receive power of the measurement signal and the target transmit or forwarding power. The relay device determines an amplification gain based on a current capability of the relay device and a difference between the target transmit power and the receive power of the measurement signal.

Optionally, the amplification gain determined by the relay device is a difference between the target transmit power and the receive power of the measurement signal.

In an example, the relay device determines that the receive power of the measurement signal is $P_R$. When the amplification gain used by the relay device is G, the power at which the relay device forwards the measurement signal is $P_T=P_R+G$. The relay device determines that the target transmit power is $TP_T$. When a value of G makes $P_T=TP_T$, the value of G is the amplification gain of the measurement signal that is determined by the relay device. It should be understood that the capability of the relay device further includes a maximum amplification or forwarding gain, and the amplification gain determined by the relay device should not exceed the maximum amplification gain.

In a possible implementation, the relay device includes one or more error vector magnitude (EVM) indicators. The EVM represents an error between a signal received by the relay device and a signal forwarded by the relay device. The EVM indicates a signal forwarding quality. A lower EVM indicates a better forwarding quality. In different EVM indicators, maximum forwarding power or maximum transmit power corresponding to forwarding of the relay device may be different. For example, when the EVM indicator is low, the relay device needs more power back-off to ensure a signal quality, and a corresponding forwarding power or amplification gain is low. When the EVM indicator is high, the relay device needs low power back-off, and a corresponding forwarding power or amplification gain is high.

In an example, a correspondence between the EVM indicator and the forwarding power or the transmit power of the relay device is shown in the following Table 1.

TABLE 1

| EVM indicator | Forwarding power (dBm) | Forwarding power offset |
|---|---|---|
| 6% | X1 | Δ1 |
| 10% | X2 | Δ2 |
| 15% | X3 | Δ3 |
| . . . | . . . | . . . |

In Table 1, forwarding power information of the relay device under different EVM indicators is described as an example. The forwarding power information may be directly provided by using an absolute value (of which a unit may be dBm) of the forwarding power, or may be provided by using an offset value of the forwarding power.

In this case, the relay device determines the amplification gain based on the receive quality and target transmit quality corresponding to the EVM.

The relay device determines different amplification gains when the target transmit quality corresponding to the EVM is different.

Specifically, the relay device determines that the measurement signal corresponds to a first EVM and a second EVM.

The relay device determines a receive power of the measurement signal and a target transmit or forwarding power corresponding to the first EVM. The relay device determines, based on a current capability of the relay device and a difference between the target transmit power corresponding to the first EVM and the receive power of the measurement signal, an amplification gain corresponding to the first EVM.

The relay device determines the receive power of the measurement signal and a target transmit or forwarding power corresponding to the second EVM. The relay device determines, based on a current capability of the relay device and a difference between the target transmit power corresponding to the second EVM and the receive power of the measurement signal, an amplification gain corresponding to the second EVM.

S503. The relay device determines an amplification gain of a to-be-forwarded signal based on the amplification gain.

In this step, the relay device and the access network device may determine the amplification gain of the to-be-forwarded signal in a manner recorded in the following case 1 and case 2.

Case 1: The relay device determines the amplification gain of the to-be-forwarded signal based on a correspondence between the to-be-forwarded signal and the measurement signal that is indicated by the access network device as well as the foregoing amplification gain.

Case 2: The relay device reports the amplification gain to the access network device. The access network device determines the amplification gain of the to-be-forwarded signal based on the amplification gain, and indicates the amplification gain of the to-be-forwarded signal to the relay device.

The following separately describes case 1 and case 2 in detail.

Case 1: The relay device determines the amplification gain of the to-be-forwarded signal based on a correspondence between the to-be-forwarded signal and the measurement signal that is indicated by the access network device as well as the foregoing amplification gain.

Figure 6:
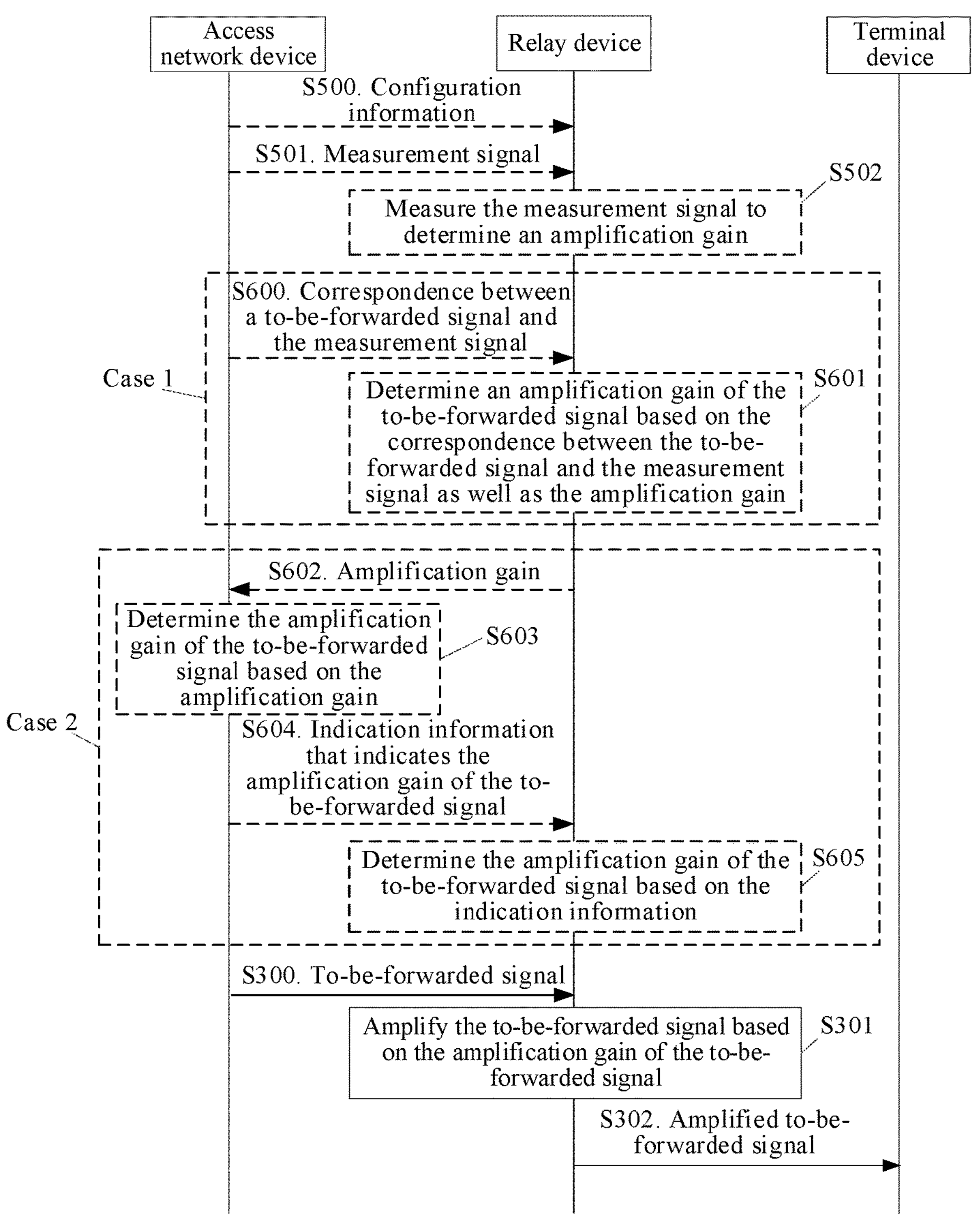
FIG. 6 is a schematic flowchart of a signal forwarding method according to an embodiment of this application.

With reference to FIG. 5, as shown in FIG. 6, in case 1, S503 may be specifically implemented by using the following S600 and S601.

S600. The access network device indicates, to the relay device, the correspondence between the to-be-forwarded signal and the measurement signal.

The relay device may determine, based on the correspondence, a measurement signal corresponding to the to-be-forwarded signal. In this way, the relay device may amplify the to-be-forwarded signal based on the measurement signal corresponding to the to-be-forwarded signal and forward an amplified to-be-forwarded signal.

Optionally, when the relay device includes the EVM, the access network device may further indicate a target EVM to the relay device. Therefore, the relay device determines the amplification gain of the to-be-forwarded signal based on the correspondence between the to-be-forwarded signal and the measurement signal as well as the target EVM. The access network device may indicate the target EVM by using at least one of RRC, a MAC-CE, or DCI.

In this step, the relay device may indicate the correspondence between the to-be-forwarded signal and the measurement signal to the relay device in the following two ways: method a and method b.

Method a: The access network device indicates, to the relay device by using a semi-static signaling message, the correspondence between the to-be-forwarded signal and the measurement signal.

In this case, the access network device may indicate the correspondence between the to-be-forwarded signal and the measurement signal to the relay device in a form shown in Table 2.

TABLE 2

| To-be-forwarded resource/signal/channel | Forwarding gain information | Additional information |
|---|---|---|
| Resource/Signal/Channel A | Measurement resource ID 1 | Offset X |
| Resource/Signal/Channel B | Measurement resource ID 2 | Offset Y |
| Resource/Signal/Channel C | Measurement resource ID 3 | Offset Z |
| . . . | . . . | . . . |

The to-be-forwarded resource/signal/channel is information about a to-be-forwarded signal (for example, transmission resource information of the to-be-forwarded signal, signal information of the to-be-forwarded signal, or channel information of the to-be-forwarded signal). The forwarding gain information is information about a measurement signal (for example, an identifier of a measurement resource) corresponding to the to-be-forwarded signal (where the to-be-forwarded signal may be specifically represented in a form of a resource, a signal, or a channel). The additional information is optional information. When there is an offset between the amplification gain of the to-be-forwarded signal and an amplification gain of the measurement resource, the configuration information may indicate, based on the additional information, an offset between the amplification gain of the to-be-forwarded signal and the amplification gain of the measurement resource.

It should be noted that the resource/signal/channel includes but is not limited to: an SS/PBCH block, a SIB1-PDSCH (a PDSCH carrying a SIB1), a SIB1-PDCCH (a PDCCH for scheduling the SIB1-PDSCH), a CSI-RS, a TRS (CSI-RS for tracking), a broadcast PDCCH, a broadcast PDSCH, a periodic or semi-persistent slot or subframe.

In a possible implementation, when the access network device separately indicates, to the relay device, the correspondence between the to-be-forwarded signal and the measurement signal and the target EVM, the relay device may indicate, to the relay device, the correspondence between the to-be-forwarded signal and the measurement signal as well as a target EVM of the to-be-forwarded signal in a form shown in Table 3.

TABLE 3

| To-be-forwarded resource/signal/channel | Forwarding gain information | Target EVM | Additional information |
|---|---|---|---|
| Resource/Signal/Channel A | Measurement resource ID 1 | 6% | Offset X |
| Resource/Signal/Channel B | Measurement resource ID 2 | 10% | Offset Y |
| Resource/Signal/Channel C | Measurement resource ID 3 | 15% | Offset Z |
| . . . | . . . | | . . . |

The target EVM is an EVM of a measurement signal or a to-be-forwarded signal that is indicated by the access network device.

Method b: The access network device may indicate, to the relay device by using a dynamically sent signaling message, the correspondence between the to-be-forwarded signal and the measurement signal.

The dynamically sent signaling message may be a MAC-CE or DCI sent by the access network device. This is not limited in this application.

In this case, the access network device may dynamically indicate, to the relay device by using the MAC-CE or the DCI, a correspondence between one or more time-frequency resources and the measurement signal.

For example, the access network device indicates, by using the MAC-CE or the DCI, at least one of an identifier and an offset that are of a measurement resource corresponding to a to-be-forwarded signal sent in a specific slot.

It should be noted that, in method b, when the access network device separately indicates, to the relay device, the correspondence between the to-be-forwarded signal and the measurement signal as well as the target EVM, the access network device may further separately indicate, to the relay device based on DCI, the correspondence between the to-be-forwarded signal and the measurement signal and the target EVM. Alternatively, the access network device may separately indicate, to the relay device based on the MAC-CE, the correspondence between the to-be-forwarded signal and the measurement signal as well as the target EVM.

It should be noted that, in case 1, after the relay device measures the measurement signal to determine the amplification gain, the relay device may also perform S602 in the following case 2, to report the amplification gain to the access network device.

S601. The access network device determines the amplification gain of the to-be-forwarded signal based on the correspondence between the to-be-forwarded signal and the measurement signal as well as the amplification gain.

It should be noted that, when the to-be-forwarded signal is carried on the time-frequency resource, and the time-frequency resource corresponds to the measurement signal, the access network device determines a correspondence between the time-frequency resource and the measurement signal, and associates the amplification gain determined by measuring the measurement signal with the time-frequency resource.

Then, after receiving the to-be-forwarded signal on the time-frequency resource, the access network device amplifies the to-be-forwarded signal based on the amplification gain associated with the time-frequency resource.

In a possible implementation, the relay device determines that an amplification gain of the measurement signal corresponding to the to-be-forwarded signal is the same as the amplification gain of the to-be-forwarded signal. For example, if the to-be-forwarded signal and the measurement signal have a same beam and bandwidth, and the relay device determines that a value of the amplification gain of the measurement signal corresponding to the to-be-forwarded signal is 10 dB, the relay device determines that the value of the amplification gain of the to-be-forwarded signal is 10 dB. In this case, the relay device may assume that the to-be-forwarded signal and the measurement signal have a same beam and bandwidth. Therefore, the relay device may forward the to-be-forwarded signal by using the amplification gain determined by the measurement signal.

In another possible implementation, the relay device calculates and determines the amplification gain of the to-be-forwarded signal based on the amplification gain of the measurement signal corresponding to the to-be-forwarded signal. For example, if the relay device determines that the value of the amplification gain of the measurement signal corresponding to the to-be-forwarded signal is 10 dB, and the relay device determines that an offset between the amplification gain of the measurement signal corresponding to the to-be-forwarded signal and the amplification gain of the to-be-forwarded signal is −2 dB, the relay device determines that the value of the amplification gain of the to-be-forwarded signal is 10 dB−2 dB=8 dB. The offset value may be defined by a protocol, or configured or indicated by the access network device.

Optionally, the relay device may assume that there is a fixed relationship between the beam and the bandwidth of the to-be-forwarded signal and the beam and the bandwidth of the measurement signal. For example, the beams of the to-be-forwarded signal and the measurement signal are the same, but the bandwidths of the to-be-forwarded signal and the measurement signal have a fixed difference. In this case, the relay device may use an amplification gain determined by the measurement signal to assume an additional offset to forward the to-be-forwarded signal.

In still another possible implementation, the relay device determines that an amplification gain of the measurement signal corresponding to the to-be-forwarded signal in the target EVM is the same as an amplification gain of the to-be-forwarded signal in the target EVM. For example, if the to-be-forwarded signal and the measurement signal have a same beam and bandwidth, and the relay device determines that a value of the amplification gain of the measurement signal corresponding to the to-be-forwarded signal in the target EVM is 10 dB, the relay device determines that the value of the amplification gain of the to-be-forwarded signal in the target EVM is 10 dB.

In still another possible implementation, the relay device calculates and determines an amplification gain of the to-be-forwarded signal in the target EVM based on an amplification gain of the measurement signal corresponding to the to-be-forwarded signal in the target EVM. For example, if the relay device determines that the value of the amplification gain of the measurement signal corresponding to the to-be-forwarded signal in the target EVM is 10 dB, and the relay device determines that an offset between the amplification gain of the measurement signal corresponding to the to-be-forwarded signal in the target EVM and the amplification gain of the to-be-forwarded signal in the target EVM is −2 dB, the relay device determines that the value of the amplification gain of the to-be-forwarded signal in the target EVM is 10 dB−2 dB=8 dB. Optionally, an EVM of the to-be-forwarded signal and an EVM of the measurement signal may be the same or may be different.

It should be noted that the access network device may indicate a correspondence between the to-be-forwarded signal and the measurement signal to the relay device in method a and method b respectively. The correspondence between the to-be-forwarded signal and the measurement signal that is indicated by the access network device in the method a and the method b may be different.

In this case, the relay device may separately set different priorities for the method a and the method b. When the relay device separately determines the amplification gain of the to-be-forwarded signal based on a correspondence indicated in the method a and a correspondence indicated in the method b, the relay device amplifies the to-be-forwarded signal by using the amplification gain determined in a method with a higher priority and forwards an amplified to-be-forwarded signal.

For example, the relay device determines that a priority of method b is higher than a priority of the method a. In this case, when the relay device separately determines the amplification gain of the to-be-forwarded signal based on a correspondence indicated in the method a and a correspondence indicated in the method b, the relay device amplifies the to-be-forwarded signals by using the amplification gain of the to-be-forwarded signal that is determined based on the correspondence indicated in the method b and forwards an amplified to-be-forwarded signal.

Case 2: The access network device instructs an amplification gain, and the relay device determines the amplification gain of the to-be-forwarded signal based on an instruction of the access network device.

With reference to FIG. 5, as shown in FIG. 6, in case 2, S503 may be specifically implemented by using the following S602 to S605.

S602. The relay device reports the amplification gain to the access network device. Correspondingly, the access network device receives the amplification gain from the relay device.

It should be noted that, in addition to the amplification gain of the measurement signal, information reported by the relay device to the access network device may further include at least one of the following parameters: a receive power of the measurement signal, a target forwarding power, an amplifying power headroom of the relay device, a maximum amplification gain of the relay device, a current amplification gain of the relay device, and the like. This is not limited in this embodiment of this application.

The receive power of the measurement signal is the receive power of the measurement signal that is determined by the relay device after the relay device measures the measurement signal, for example, an RSRP or an RSRI of the measurement signal.

The target forwarding power is a transmit power that the relay device expects to reach in a period of forwarding a signal (the measurement signal or the to-be-forwarded signal). Different types of to-be-forwarded signals may have different target transmit power. Optionally, the target forwarding power is a maximum forwarding or transmit power that can be reached by the relay device. It should be understood that the maximum forwarding or transmit power needs to meet a specific EVM indicator.

The maximum amplification gain of the relay device is a maximum value of an amplifying power that can be reached when the relay device performs power amplification.

The amplifying power headroom of the relay device is equal to a difference between the maximum amplifying power of the relay device and an amplifying power of the measurement signal reported by the relay device. When the amplifying power headroom of the relay device is greater than 0, the relay device may amplify the to-be-forwarded signal to the target forwarding power. After the relay device performs power amplification on the to-be-forwarded signal by using the maximum amplification gain, if the amplifying power of the to-be-forwarded signal still cannot reach an optimal amplifying power, a power headroom may be defined as a negative number, indicating that the optimal amplification gain is greater than the maximum amplification gain of the relay device, or the relay device cannot amplify the to-be-forwarded signal to the target forwarding power.

After obtaining the power amplifying headroom of the relay device, the access network device may adjust a transmit signal, to improve signal propagation efficiency. For example, when the power amplifying headroom of the access network device in the relay device is greater than a preset value, the access network device transmits the to-be-forwarded signal by using a low transmit power, and the relay device performs high power amplification on the to-be-forwarded signal, thereby reducing power consumption of the access network device. When the power amplifying headroom of the access network device in the relay device is less than or equal to the preset value, the access network device transmits the to-be-forwarded signal by using a high transmit power, and the relay device performs power amplification of the high power on the to-be-forwarded signal, to avoid signal transmission damage caused by insufficient amplifying power of the relay device. Optionally, the access network device may adjust the transmit power by selecting a quantity of antenna array planes for transmitting a signal to the relay device.

It should be noted that if the access network device adjusts the transmit power of the to-be-forwarded signal, a value of the amplification gain of the to-be-forwarded signal that is determined by the relay device also needs to be adjusted accordingly.

A current amplification gain of the relay device is a value of an amplification gain currently used by the relay device to forward a signal.

It should be noted that, when the relay device includes one or more EVMs, the one or more EVMs correspond to different amplification gains (for example, the to-be-forwarded signal corresponds to different amplification gains in different EVMs, and the measurement signal corresponds to different amplification gains in different EVMs). The relay device may further send, to the access network device, amplification gains corresponding to all or some of the one or more EVMs.

The relay device may report the amplification gains to the access network device based on one or more predefined EVM indicators. For example, the relay device reports an amplification gain of another EVM based on an amplification gain of a specific EVM. The gain of the other EVM reported by the relay device may be an offset of the amplification gain of the other EVM relative to the amplification gain of the specific EVM.

S603. The access network device determines the amplification gain of the to-be-forwarded signal based on the amplification gain.

In a possible implementation, a value of the amplification gain of the measurement signal that is reported by the relay device to the access network device is the same as a value of the amplification gain of the to-be-forwarded signal that is indicated by indication information generated by the access network device.

For example, if the relay device determines that the value of the amplification gain of the measurement signal is 10 dB, the value of the amplification gain of the measurement signal reported by the relay device to the access network device is 10 dB, and the value of the amplification gain of the to-be-forwarded signal that is indicated by the indication information generated by the access network device is also 10 dB.

In another possible implementation, the amplification gain of the to-be-forwarded signal that is indicated by the indication information generated by the access network device is calculated and determined by the relay device based on a value of the amplification gain of the measurement signal that is reported by the access network device. In this case, the value of the amplification gain of the measurement signal that is reported by the relay device to the access network device is only a recommended value, and the access network device may flexibly determine, based on the value, the value of the amplification gain of the to-be-forwarded signal that is indicated by the indication information.

For example, if the relay device determines that the value of the amplification gain of the measurement signal is 10 dB, the value of the amplification gain of the measurement signal reported by the relay device to the access network device is 10 dB, and the access network device determines that an offset between the amplification gain of the to-be-forwarded signal and the value of the amplification gain of the measurement signal is 2 dB, the value of the amplification gain of the to-be-forwarded signal indicated by the indication information generated by the access network device is 8 dB.

In a possible implementation, the access network device determines the offset based on a transmit power difference between the to-be-forwarded signal and the measurement signal. For example, the access network device sends a measurement signal by using power X dBm, and sends a to-be-forwarded signal by using power X+3 dBm. The amplification gain indicated by the access network device to the relay device may be 3 dB less than the amplification gain reported by the relay device, to ensure that the relay device obtains a same transmit or forwarding power after amplifying the to-be-forwarded signal and the measurement signal.

It should be noted that, in a case that the relay device includes one or more EVMs, when measuring the measurement signal, the relay device may separately determine amplification gains corresponding to different EVMs. When the access network device receives amplification gains that are reported by the relay device and that correspond to different EVMs, the access network device determines the amplification gain of the to-be-forwarded signal based on the EVM of the to-be-forwarded signal and the amplification gain corresponding to each EVM.

That the access network device determines the amplification gain of the to-be-forwarded signal based on the amplification gain may be specifically: The access network device determines the amplification gain of the to-be-forwarded signal based on the amplification gain and an EVM corresponding to the to-be-forwarded signal.

S604. The access network device sends the indication information to the relay device. Correspondingly, the relay device receives the indication information from the access network device.

The indication information indicates the amplification gain of the to-be-forwarded signal. The indication information may be carried in a DCI sent by the access network device to the relay device. Alternatively, the indication information may be carried in a MAC-CE sent by the access network device to the relay device.

In a possible implementation, the indication information is used to directly indicate an amplification gain value of the to-be-forwarded signal. For example, the indication information indicates that the amplification gain value of the to-be-forwarded signal is 10 dB.

In another possible implementation, the indication information indicates an offset value of the amplification gain value of the to-be-forwarded signal relative to the reference value. The reference value may be an amplification gain of a specific measurement signal (denoted as a standard measurement signal). In this case, the indication information may indicate an offset value and an identifier of the standard measurement signal.

For example, if the amplification gain of the standard measurement signal is 8 dB, and the offset value indicated by the indication information is 2 dB, the relay device determines that the amplification gain of the to-be-forwarded signal is 10 dB.

S605. The relay device determines the amplification gain of the to-be-forwarded signal based on the indication information.

Specifically, the relay device uses the amplification gain value indicated by the indication information as the amplification gain value of the to-be-forwarded signal.

It should be noted that, in S503, the relay device may determine the amplification gain of the to-be-forwarded signal in the manner recorded in any one of the foregoing case 1 and case 2.

Alternatively, the relay device may separately determine the amplification gain of the to-be-forwarded signal in the manner recorded in the foregoing case 1 and case 2. For example, the relay device may determine an amplification gain of a signal or a channel such as an SSB or a CSI-RS in the manner of case 1, but determine an amplification gain in a specific slot, a subarray, a symbol, or a symbol set in the manner of case 2. Amplification gains of the to-be-forwarded signal that are determined by the relay device in different cases have different priorities. The relay device determines, based on the priorities of the amplification gains of the to-be-forwarded signal that are determined in different cases, a final amplification gain of the to-be-forwarded signal.

For example, the relay device determines the priorities of the amplification gains of the to-be-forwarded signal by using case 1 and case 2 in descending order are as follows: case 1>case 2. After separately determining the amplification gains of the to-be-forwarded signal in the foregoing different cases, the relay device amplifies the to-be-forwarded signal based on the amplification gain determined in case 1.

Based on the foregoing technical solution, when there are a plurality of types of to-be-forwarded signals, the access network device may configure, for the relay device, a measurement signal corresponding to a type of the to-be-forwarded signal; and determine the amplification gain of the to-be-forwarded signal based on the measurement signal as well as a correspondence between the measurement signal and the to-be-forwarded signal. Therefore, the method recorded in this application can be applied to a scenario in which a plurality of types of to-be-forwarded signals are transmitted between an access network device and a relay device.

The solutions in the foregoing embodiments of this application may be combined without a conflict.

The foregoing mainly describes the solutions in embodiments of this application from a perspective of interaction between network elements. It may be understood that, to implement the foregoing functions, each network element, for example, the access network device and the relay device, includes at least one of a corresponding hardware structure and software module for performing each function. A person skilled in the art should easily be aware that, based on the units and algorithm steps in the examples described with reference to embodiments disclosed in this specification, this application can be implemented through hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the access network device and the relay device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, unit division is an example, and is merely logical function division. In actual implementation, another division method may be used.

Figure 7:
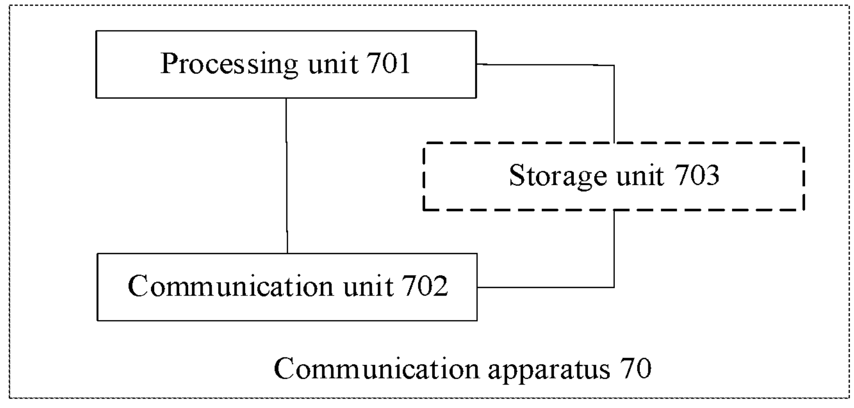
FIG. 7 is a schematic diagram of a structure of a communication apparatus according to an embodiment of this application.

When the integrated unit is used, FIG. 7 is a possible schematic diagram of a structure of the communication apparatus (denoted as a communication apparatus 70) in the foregoing embodiments. The communication apparatus 70 includes a processing unit 701 and a communication unit 702, and may further include a storage unit 703. The schematic diagram of the structure shown in FIG. 7 may be used to show structures of the access network device and the relay device in the foregoing embodiments.

When the schematic diagram of the structure shown in FIG. 7 is used to show the structure of the access network device in the foregoing embodiments, the processing unit 701 is configured to control and manage actions of the access network device, for example, control the access network device to perform S500, S501, and S300 in FIG. 5, S500, S501, S600, S602, S604 and S300 in FIG. 6, and/or actions performed by the access network device in another process described in embodiments of this application. The processing unit 701 may communicate with another network entity by using the communication unit 702, for example, communicate with the access network device shown in FIG. 1. The storage unit 703 is configured to store program code and data of the access network device.

When the schematic diagram of the structure shown in FIG. 7 is used to show the structure of the access network device in the foregoing embodiments, the communication apparatus 70 may be an access network device, or may be a chip in the access network device.

When the schematic diagram of the structure shown in FIG. 7 is used to show the structure of the relay device in the foregoing embodiment, the processing unit 701 is configured to control and manage actions of the relay device, for example, control the relay device to perform S300 to S302 in FIG. 3, S300*a*, S301*a*, and S302 in FIG. 4, S500 to S503 and S300 to S302 in FIG. 5, and S500 to S502, S600, S601, S602, S604, S605, and S300 to S302 in FIG. 6, and/or actions performed by the relay device in another process described in embodiments of this application. The processing unit 701 may communicate with another network entity by using the communication unit 702, for example, communicate with the relay device shown in FIG. 1. The storage unit 703 is configured to store program code and data of the relay device.

When the schematic diagram of the structure shown in FIG. 7 is used to show the structure of the relay device in the foregoing embodiments, the communication apparatus 70 may be a relay device, or may be a chip in the relay device.

When the communication apparatus 70 is a relay device or an access network device, the processing unit 701 may be a processor or a controller, and the communication unit 702 may be a communication interface, a transceiver, a transceiver machine, a transceiver circuit, a transceiver apparatus, or the like. The communication interface is a general term, and may include one or more interfaces. The storage unit 703 may be a memory. When the communication apparatus 70 is a chip in a relay device or an access network device, the processing unit 701 may be a processor or a controller, and the communication unit 702 may be an input interface and/or an output interface, a pin, a circuit, or the like. The storage unit 703 may be a storage unit (for example, a register or a cache) in the chip, or may be a storage unit (for example, a read-only memory (ROM) a random access memory (RAM), or the like) in the relay device or the access network device that is located outside the chip.

The communication unit may also be referred to as a transceiver unit. An antenna and a control circuit that have receiving and sending functions in the communication apparatus 70 may be considered as the communication unit 702 in the communication apparatus 70. A processor that has a processing function in the communication apparatus 70 may be considered as the processing unit 701 in the communication apparatus 70. Optionally, a component configured to implement a receiving function in the communication unit 702 may be considered as a receiving unit. The receiving unit is configured to perform the receiving step in embodiments of this application. The receiving unit may be a receiver machine, a receiver, a receiver circuit, or the like.

When the integrated unit in FIG. 7 is implemented in the form of a software functional module and sold or used as an independent product, the integrated unit may be stored in a computer-readable storage medium. Based on such an understanding, the technical solutions of embodiments of this application essentially, or the part contributing to the conventional technologies, or all or a part of the technical solutions may be implemented in a form of a software product. The computer software product is stored in a storage medium, and includes several instructions for instructing a computer device (which may be a personal computer, a server, a network device, or the like) or a processor to perform all or a part of the steps of the methods described in embodiments of this application. The storage medium that stores the computer software product includes any medium that can store program code, such as a USB flash drive, a removable hard disk, a read-only memory, a random access memory, a magnetic disk, or an optical disc.

The unit in FIG. 7 may also be referred to as a module. For example, the processing unit may be referred to as a processing module.

Figure 8:
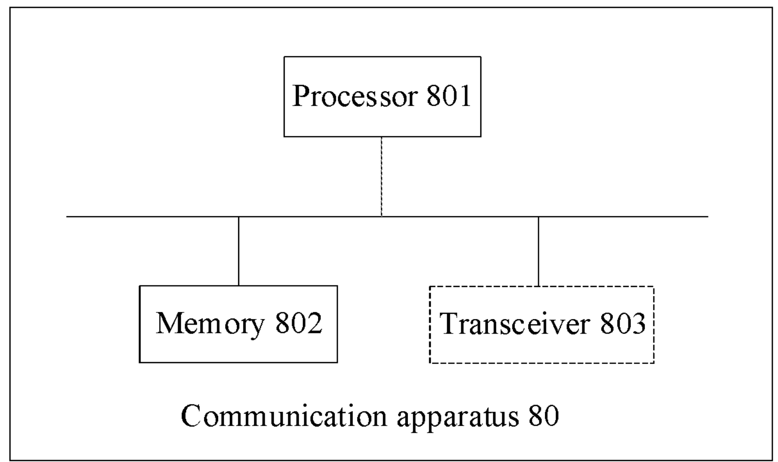
FIG. 8 is a schematic diagram of a hardware structure of a communication apparatus according to an embodiment of this application.
Figure 9:
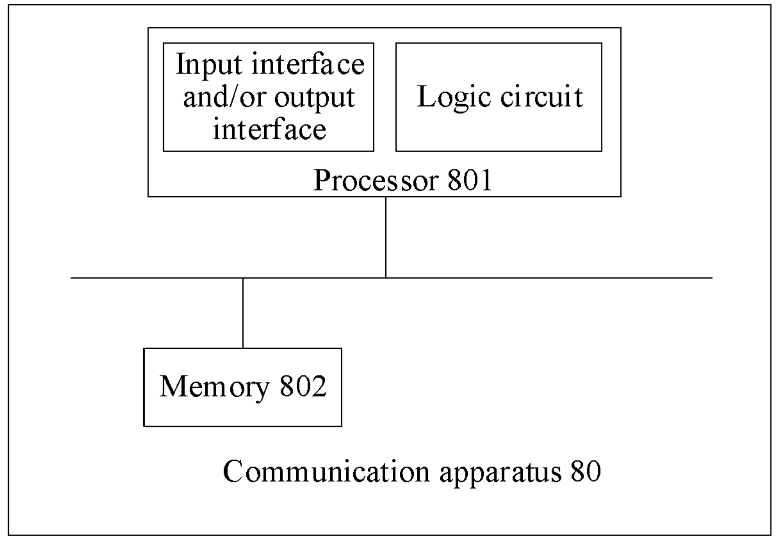
FIG. 9 is a schematic diagram of a hardware structure of a communication apparatus according to an embodiment of this application.

An embodiment of this application further provides a schematic diagram of a hardware structure of a communication apparatus (denoted as a communication apparatus 80). Referring to FIG. 8 or FIG. 9, the communication apparatus 80 includes a processor 801, and optionally, also includes a memory 802 connected to the processor 801.

In a first possible implementation, refer to FIG. 8. The communication apparatus 80 further includes a transceiver 803. The processor 801, the memory 802, and the transceiver 803 are connected by using a bus. The transceiver 803 is configured to communicate with another device or a communication network. Optionally, the transceiver 803 may include a transmitter and a receiver. A component configured to implement a receiving function in the transceiver 803 may be considered as a receiver. The receiver is configured to perform a receiving step in embodiments of this application. A component configured to implement a sending function in the transceiver 803 may be considered as a transmitter. The transmitter is configured to perform a sending step in embodiments of this application.

Based on the first possible implementation, the schematic diagram of the structure shown in FIG. 8 may be used to show the structure of the access network device or the relay device in the foregoing embodiments.

When the schematic diagram of the structure shown in FIG. 8 is used to show the structure of the access network device in the foregoing embodiments, the processor 801 is configured to control and manage actions of the access network device. For example, the processor 801 is configured to support the access network device in performing S500, S501, and S300 in FIG. 5, S500, S501, S600, S602, S604 and S300 in FIG. 6, and/or actions performed by the access network device in another process described in embodiments of this application. The processor 801 may communicate with another network entity by using the transceiver 803, for example, to communicate with the relay device shown in FIG. 1. The memory 802 is configured to store program code and data of the access network device.

When the schematic diagram of the structure shown in FIG. 8 is used to show the structure of the relay device in the foregoing embodiment, the processor 801 is configured to control and manage actions of the relay device. For example, the processor 801 is configured to support the relay device in performing S300 to S302 in FIG. 3, S300*a*, S301*a*, and S302 in FIG. 4, S500 to S503 and S300 to S302 in FIG. 5, S500 to S502, S600, S601, S602, S604, S605, and S300 to S302 in FIG. 6, and/or actions performed by the relay device in another process described in embodiments of this application. The processor 801 may communicate with another network entity by using the transceiver 803, for example, to communicate with the access network device shown in FIG. 1. The memory 802 is configured to store program code and data of the relay device.

In a second possible implementation, the processor 801 includes a logic circuit and at least one of an input interface and an output interface. The output interface is configured to perform a sending action in a corresponding method, and the input interface is configured to perform a receiving action in a corresponding method.

Based on the second possible implementation, refer to FIG. 9. The schematic diagram of the structure shown in FIG. 9 may be used to show the structure of the access network device or the relay device in the foregoing embodiments.

When the schematic diagram of the structure shown in FIG. 9 is used to show the structure of the access network device in the foregoing embodiments, the processor 801 is configured to control and manage actions of the access network device. For example, the processor 801 is configured to support the access network device in performing S500, S501, and S300 in FIG. 5, S500, S501, S600, S602, S604 and S300 in FIG. 6, and/or actions performed by the access network device in another process described in embodiments of this application. The processor 801 may communicate with another network entity by using at least one of an input interface and an output interface, for example, to communicate with the relay device shown in FIG. 1. The memory 802 is configured to store program code and data of the access network device.

When the schematic diagram of the structure shown in FIG. 9 is used to show the structure of the relay device in the foregoing embodiment, the processor 801 is configured to control and manage actions of the relay device. For example, the processor 801 is configured to support the relay device in performing S300 to S302 in FIG. 3, S300*a*, S301*a*, and S302 in FIG. 4, S500 to S503 and S300 to S302 in FIG. 5, S500 to S502, S600, S601, S602, S604, S605, and S300 to S302 in FIG. 6, and/or actions performed by the relay device in another process described in embodiments of this application. The processor 801 may communicate with another network entity by using at least one of an input interface and an output interface, for example, to communicate with the access network device shown in FIG. 1. The memory 802 is configured to store program code and data of the relay device.

FIG. 8 and FIG. 9 may also show a system chip in the relay device. In this case, the action performed by the relay device may be implemented by the system chip. For a specific action to be performed, refer to the foregoing description. Details are not described herein again. FIG. 8 and FIG. 9 may also show a system chip in the access network device. In this case, the action performed by the access network device may be implemented by the system chip. For a specific action to be performed, refer to the foregoing description. Details are not described herein again.

In an implementation process, the steps in the method provided in this embodiment may be completed by using an integrated logic circuit of hardware in the processor or an instruction in a form of software. The steps of the method disclosed with reference to embodiments of this application may be directly performed by a hardware processor, or may be performed by using a combination of hardware in the processor and a software module.

The processor in this application may include but is not limited to at least one of the following types: a central processing unit (CPU), a microprocessor, a digital signal processor (DSP), a microcontroller unit (MCU), or a computing device used for running software such as an artificial intelligence processor. Each computing device may include one or more cores used to execute software instructions to perform operations or processing. The processor may be an independent semiconductor chip, or may be integrated with another circuit into a semiconductor chip. For example, the processor may form a SoC (system-on-chip) with another circuit (for example, a codec circuit, a hardware acceleration circuit, or various buses and interface circuits). Alternatively, the processor may be integrated into an ASIC as a built-in processor of the ASIC. The ASIC integrated with the processor may be separately packaged, or may be packaged with another circuit. In addition to a core configured to execute a software instruction to perform an operation or processing, the processor may further include a necessary hardware accelerator, for example, a field programmable gate array (FPGA), a PLD (programmable logic device), or a logic circuit for implementing a dedicated logic operation.

The memory in this embodiment of this application may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing access network device and the foregoing relay device.

An embodiment of this application further provides a chip. The chip includes a processor and an interface circuit. The interface circuit is coupled to the processor. The processor is configured to run a computer program or instructions, to implement the foregoing method. The interface circuit is configured to communicate with another module other than the chip.

All or a part of the foregoing embodiments may be implemented by software, hardware, firmware, or any combination thereof. When a software program is used to implement embodiments, all or a part of embodiments may be implemented in a form of a computer program product. The computer program product includes one or more computer instructions. When computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not indicate that these measures cannot be combined to produce a better effect.

Although this application is described with reference to specific features and embodiments thereof, it is clear that various modifications and combinations may be made to the application without departing from the spirit and scope of this application. Correspondingly, the specification and accompanying drawings are merely examples of descriptions of this application defined by the appended claims, and are considered as any or all modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A signal forwarding method, comprising:

receiving a to-be-forwarded signal;

amplifying the to-be-forwarded signal based on an amplification gain of the to-be-forwarded signal to yield an amplified to-be-forwarded signal, wherein the amplification gain of the to-be-forwarded signal is determined by measuring a measurement signal corresponding to the to-be-forwarded signal, wherein the to-be-forwarded signal is carried on a time-frequency resource corresponding to the measurement signal, wherein receiving the to-be-forwarded signal comprises receiving the to-be-forwarded signal on the time-frequency resource, and wherein amplifying the to-be-forwarded signal comprises determining, based on a correspondence between the time-frequency resource and the measurement signal, the amplification gain determined by measuring the measurement signal; and forwarding the amplified to-be-forwarded signal.

2. The method according to claim 1, further comprising: receiving the measurement signal, and measuring the measurement signal to determine the amplification gain.

3. The method according to claim 2, wherein measuring the measurement signal to determine the amplification gain comprises:

measuring the measurement signal to determine a receive quality; and determining the amplification gain based on the receive quality and a target transmit quality.

4. The method according to claim 3, wherein determining the amplification gain based on the receive quality and target transmit quality comprises:

determining the amplification gain based on the receive quality and the target transmit quality corresponding to an error vector magnitude EVM.

5. The method according to claim 4, wherein the EVM is indicated by at least one of the following signalings:

RRC;

a MAC-CE; and

DCI.

6. The method according to claim 3, wherein the method further comprises reporting the amplification gain.

7. The method according to claim 6, wherein the method further comprises: receiving indication information, wherein the indication information is used to determine the amplification gain of the to-be-forwarded signal.

8. The method according to claim 3, wherein the target transmit quality includes at least a target transmit or forwarding power.

9. The method according to claim 1, wherein the measurement signal is indicated by using at least one of the following signalings:

RRC;

a MAC-CE; and

DCI.

10. A communication apparatus, comprising:

a processor; and a non-transitory computer-readable storage medium storing a program to be executed by the processor, the program including instructions to:

receive a to-be-forwarded signal;

amplify the to-be-forwarded signal based on an amplification gain of the to-be-forwarded signal to yield an amplified to-be-forwarded signal, wherein the amplification gain of the to-be-forwarded signal is determined by measuring a measurement signal corresponding to the to-be-forwarded signal, wherein the to-be-forwarded signal is carried on a time-frequency resource corresponding to the measurement signal, wherein receiving the to-be-forwarded signal comprises receiving the to-be-forwarded signal on the time-frequency resource, and wherein amplifying the to-be-forwarded signal comprises determining, based on a correspondence between the time-frequency resource and the measurement signal, the amplification gain determined by measuring the measurement signal; and forward the amplified to-be-forwarded signal.

11. The communication apparatus according to claim 10, wherein the program further includes instructions to:

receive the measurement signal; and measure the measurement signal to determine the amplification gain.

12. The communication apparatus according to claim 11, wherein the program further includes instructions to:

measure the measurement signal to determine a receive quality; and determine the amplification gain based on the receive quality and a target transmit quality.

13. The communication apparatus according to claim 12, wherein the program further includes instructions to:

determine the amplification gain based on the receive quality and target transmit quality corresponding to an error vector magnitude EVM.

14. The communication apparatus according to claim 13, wherein the EVM is indicated by at least one of the following signalings:

RRC;

a MAC-CE; and

DCI.

15. The communication apparatus according to claim 12, wherein the program further includes instructions to:

report the amplification gain.

16. The communication apparatus according to claim 15, wherein the program further includes instructions to:

receive indication information, wherein the indication information is used to determine the amplification gain of the to-be-forwarded signal.

17. The communication apparatus according to claim 12, wherein the target transmit quality includes at least a target transmit or forwarding power.

18. The communication apparatus according to claim 10, wherein the measurement signal is indicated by using at least one of the following signalings:

RRC;

a MAC-CE; and

DCI.

19. A non-transitory computer-readable storage medium comprising:

a computer program or instructions, and when the computer program or the instructions are run on a computer, the computer is enabled to perform:

receiving a to-be-forwarded signal;

amplifying the to-be-forwarded signal based on an amplification gain of the to-be-forwarded signal, wherein the amplification gain of the to-be-forwarded signal is determined by measuring a measurement signal corresponding to the to-be-forwarded signal, wherein the to-be-forwarded signal is carried on a time-frequency resource corresponding to the measurement signal, wherein receiving the to-be-forwarded signal comprises receiving the to-be-forwarded signal on the time-frequency resource, and wherein amplifying the to-be-forwarded signal comprises determining, based on a correspondence between the time-frequency resource and the measurement signal, the amplification gain determined by measuring the measurement signal; and forward the amplified to-be-forwarded signal.

20. The non-transitory computer-readable storage medium of claim 19, wherein when the computer program or the instructions are run on the computer, the computer is further enabled to perform receiving the measurement signal, and measuring the measurement signal to determine the amplification gain.

* * * * *